US010522832B2

(12) United States Patent
Niwata et al.

(10) Patent No.: US 10,522,832 B2
(45) Date of Patent: Dec. 31, 2019

(54) SECONDARY BATTERY-USE POSITIVE ELECTRODE ACTIVE MATERIAL, SECONDARY BATTERY-USE POSITIVE ELECTRODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: MURATA MANUFACTURING CO., LTD., Kyoto (JP)

(72) Inventors: Yuki Niwata, Kyoto (JP); Shingo Nakasato, Kyoto (JP); Asuki Yanagihara, Kyoto (JP); Yosuke Hosoya, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 16/041,911

(22) Filed: Jul. 23, 2018

(65) Prior Publication Data

US 2018/0331362 A1 Nov. 15, 2018

Related U.S. Application Data

(63) Continuation of application No. PCT/JP2017/001393, filed on Jan. 17, 2017.

(30) Foreign Application Priority Data

Feb. 8, 2016 (JP) ................................ 2016-022013

(51) Int. Cl.
*H01M 4/00* (2006.01)
*H01M 4/525* (2010.01)
(Continued)

(52) U.S. Cl.
CPC .......... *H01M 4/525* (2013.01); *H01M 4/362* (2013.01); *H01M 4/505* (2013.01);
(Continued)

(58) Field of Classification Search
CPC ..... Y02E 60/122; H01M 4/505; H01M 4/525; H01M 10/052; H01M 10/0566; H01M 2220/30; H01M 4/362
See application file for complete search history.

(56) References Cited

U.S. PATENT DOCUMENTS

2014/0158932 A1* 6/2014 Sun ........................ H01M 4/13 252/182.1
2016/0181597 A1 6/2016 Kim et al.

FOREIGN PATENT DOCUMENTS

EP 2 940 761 11/2015
EP 3 024 070 5/2016
(Continued)

OTHER PUBLICATIONS

International Search Report and Written Opinion issued in connection with International Patent Application No. PCT/JP2017/001393, dated Apr. 25, 2017. (7 pages).
(Continued)

*Primary Examiner* — Cynthia H Kelly
*Assistant Examiner* — Monique M Wills
(74) *Attorney, Agent, or Firm* — K&L Gates LLP

(57) ABSTRACT

A secondary battery includes a positive electrode including a positive electrode active material which includes a center portion including a lithium composite oxide including cobalt and an element M, and a covering portion that is provided on at least a portion of a surface of the center portion and contains lithium, nickel, and manganese elements. A concentration thereof has a gradient in a direction from a surface toward a center of the positive electrode active material. A
(Continued)

20
21 22 23
21A 21B 22A 22B first molar fraction satisfies 0.03<R<0.13 at a first position within the covering portion where the proportion D satisfies D=0.05. A second molar fraction satisfies 0.01<R<0.13 at a second position within the center portion where the proportion D satisfies D=0.3. A ratio F of the second molar fraction to the first molar fraction satisfies 0.7≤F≤1.

13 Claims, 7 Drawing Sheets

(51) Int. Cl.

| | |
|---|---|
| ***H01M 4/505*** | (2010.01) |
| ***H01M 10/0566*** | (2010.01) |
| ***H01M 4/36*** | (2006.01) |
| ***H01M 10/0525*** | (2010.01) |
| *H01M 4/86* | (2006.01) |

(52) U.S. Cl.

CPC ... *H01M 10/0525* (2013.01); *H01M 10/0566* (2013.01); *H01M 2004/8689* (2013.01)

(56) References Cited

FOREIGN PATENT DOCUMENTS

| | | | |
|---|---|---|---|
| JP | 2008-159560 | A | 12/2006 |
| JP | 2008-041570 | A | 2/2008 |
| JP | 2006-331942 | A | 7/2008 |
| KR | 10-2009-0115140 | | 11/2009 |
| KR | 10-1555594 | | 10/2015 |
| KR | 10-1568263 | | 11/2015 |
| WO | 2013/002457 | | 1/2013 |

OTHER PUBLICATIONS

Japanese Office Action dated Apr. 2, 2019 in corresponding Japanese Application No. 2017-566561.

Extended Search Report dated Sep. 23, 2019 in corresponding European Application No. 17750034.5.

Korean Office Action dated Oct. 14, 2019 in corresponding Korean Application No. 10-2018-7022501.

* cited by examiner

SECONDARY BATTERY-USE POSITIVE ELECTRODE ACTIVE MATERIAL, SECONDARY BATTERY-USE POSITIVE ELECTRODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCE TO RELATED APPLICATIONS

The present application is a continuation of PCT patent application no. PCT/JP2017/001393, filed on Jan. 17, 2017, which claims priority to Japanese patent application no. JP2016-022013 filed on Feb. 8, 2016, the entire contents of which are being incorporated herein by reference.

BACKGROUND

The present technology generally relates to a positive electrode active material used for a secondary battery, a positive electrode and a secondary battery that use the positive electrode active material, and a battery pack, an electric vehicle, an electric power storage system, an electric power tool, and an electronic apparatus that use the secondary battery.

Various electronic apparatuses such as a mobile phone and a personal digital assistant (PDA) have been widely used, and it has been demanded to reduce the sizes and weights of the electronic apparatuses and to achieve their long life. Accordingly, as an electric power source for the electronic apparatuses, a battery, in particular, a small and light-weight secondary battery capable of providing high energy density has been developed.

It has been considered to apply a secondary battery not only to the foregoing electronic apparatuses, but also to other applications. Examples of other applications include a battery pack detachably mounted on electronic apparatuses or the like, an electric vehicle such as an electric automobile, an electric power storage system such as a home electric power server, and an electric power tool such as an electric drill.

The secondary battery includes a positive electrode, a negative electrode, and an electrolytic solution, and the positive electrode contains a positive electrode active material. Since the configuration of the positive electrode active material exerts a large influence on battery characteristics, various studies have been made on the configuration of the positive electrode active material.

Specifically, the concentration distribution of main constituent elements contained in a positive electrode active material can be optimized in order to improve cycle characteristics and the like.

SUMMARY

The present technology generally relates to a secondary battery-use positive electrode active material, a secondary battery-use positive electrode, a secondary battery, a battery pack, an electric vehicle, an electric power storage system, an electric power tool, and an electronic apparatus that are capable of providing excellent battery characteristics.

According to an embodiment of the present technology, a positive electrode active material of a secondary battery is provided.

The positive electrode active material includes a center portion and a covering portion. The center portion includes a lithium composite oxide containing cobalt (Co) and an element M as constituent elements and is represented by formula (1) below; and the covering portion is provided on at least a portion of a surface of the center portion and contains lithium (Li), nickel (Ni) and manganese (Mn) as constituent elements. A concentration of each of the cobalt, the element M, the nickel, and the manganese has a gradient in a direction from a surface of the coating portion toward a center of the center portion. A depth from the surface of the covering portion is defined by a proportion D (%) represented by formula (2) below, and an amount of the element M existing in each of the center portion and the covering portion is defined by a molar fraction R represented by formula (3) below. A first molar fraction satisfies $0.03<R<0.13$ at a first position within the covering portion where the proportion D satisfies D=0.05. A second molar fraction satisfies $0.01<R<0.13$ at a second position within the center portion where the proportion D satisfies D=0.3. A ratio F of the second molar fraction to the first molar fraction satisfies $0.7\leq F\leq 1$.

$$Li_xCo_{1-y}M_yO_{2-z} \quad (1)$$

M includes one or more elements of magnesium (Mg), aluminum (Al), boron (B), titanium (Ti), vanadium (V), chromium (Cr), iron (Fe), copper (Cu), zinc (Zn), molybdenum (Mo), tin (Sn), tungsten (W), zirconium (Zr), yttrium (Y), niobium (Nb), calcium (Ca), strontium (Sr), bismuth (Bi), sodium (Na), potassium (K), silicon (Si) and phosphorus (P). x, y and z satisfy $0\leq x\leq 1$, $0<y<0.5$ and $-0.1\leq z\leq 0.2$.

$$D\ (\%)=[(\text{mass of cobalt}+\text{mass of element M}+\text{mass of nickel}+\text{mass of manganese})/\text{mass of center portion}+\text{mass of covering portion}]\times 100\% \quad (2)$$

$$R=\text{amount of element M}/(\text{amount of cobalt}+\text{amount of element M}+\text{amount of nickel}+\text{amount of manganese}) \quad (3)$$

A positive electrode of a secondary battery according to an embodiment of the present technology includes a positive electrode active material, and the positive electrode active material has a configuration similar to the positive electrode active material according to the embodiment of the present technology described herein.

A secondary battery according to an embodiment of the present technology includes a positive electrode including a positive electrode active material, a negative electrode, and an electrolytic solution, and the positive electrode active material has a configuration similar to the positive electrode active material according to the embodiment of the present technology described herein.

Each of a battery pack, an electric vehicle, an electric power storage system, an electric power tool, and an electronic apparatus according to an embodiment of the present technology includes a secondary battery, and the secondary battery has a configuration similar to that of the secondary battery of the present technology described herein.

According to embodiments of the present technology, excellent battery characteristics can be achieved. In addition, the same effect can be achieved in the battery pack, the electric vehicle, the electric power storage system, the electric power tool, and the electronic apparatus according to embodiments of the present technology.

It should be understood that the effects described herein are non-limiting, and other suitable properties relating to the present technology may be realized and as further described.

DETAILED DESCRIPTION

The present technology generally relates to a positive electrode active material used for a secondary battery, a positive electrode and a secondary battery that use the positive electrode active material, and a battery pack, an electric vehicle, an electric power storage system, an electric power tool, and an electronic apparatus that use the secondary battery. As described herein, the present disclosure will be described based on examples with reference to the drawings, but the present disclosure is not to be considered limited to the examples, and various numerical values and materials in the examples are considered by way of example.

First, description is given on a secondary battery-use positive electrode active material according to an embodiment of the present technology and a secondary battery-use positive electrode according to an embodiment of the present invention.

A secondary battery-use positive electrode (hereinafter simply referred to as "positive electrode" as well) according to an embodiment of the present technology is applied, for example, to an electrochemical device such as a secondary battery. The kind of the secondary battery to which the positive electrode is applied is not particularly limited; however, examples of the secondary battery include lithium ion secondary batteries.

A secondary battery-use positive electrode active material (hereinafter simply referred to as "positive electrode active material" as well) according to an embodiment of the present technology is applied to a positive electrode described herein. Accordingly, the positive electrode active material will be described together with the positive electrode in the followings.

Figure 1:
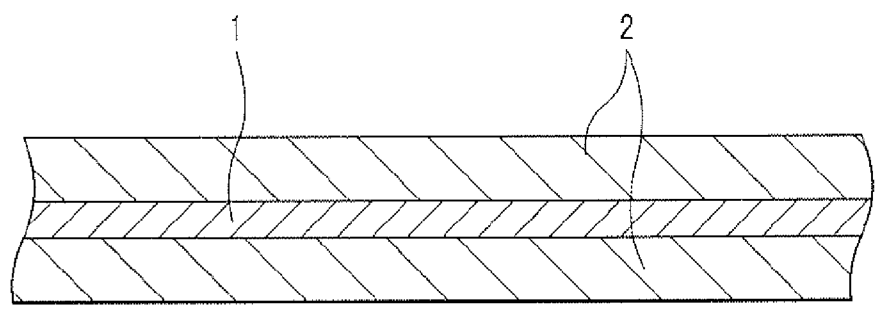
FIG. 1 is a cross-sectional view illustrating a configuration of a secondary battery-use positive electrode according to an embodiment of the present technology.

FIG. 1 illustrates a cross-sectional configuration of a positive electrode. The positive electrode includes, for example, a positive electrode current collector 1 and a positive electrode active material layer 2 provided on the positive electrode current collector 1.

The positive electrode active material layer 2 may be provided on only one surface or both surfaces of the positive electrode current collector 1. FIG. 1 illustrates, for example, the case where the positive electrode active material layer 2 is provided on both surfaces of the positive electrode current collector 1.

The positive electrode current collector 1 contains, for example, one or more conductive materials. The kind of the conductive material is not particularly limited; however, examples of the conductive material include metal materials such as aluminum, nickel, and stainless steel. However, the conductive material may be an alloy. The positive electrode current collector 1 may be configured of a single layer, or may be configured of multiple layers.

The positive electrode active material layer 2 contains one or more of positive electrode active materials capable of inserting and extracting an electrode reactant. However, the positive electrode active material layer 2 may further contain one or more of other materials such as a positive electrode binder and a positive electrode conductive agent.

The "electrode reactant" is a material participating in electrode reaction, that is, charge-discharge reaction in a secondary battery, and in the charge-discharge reaction in the secondary battery, the electrode reactant is inserted and extracted by the positive electrode active material. The kind of the electrode reactant is not particularly limited; however, for example, an electrode reactant used in a lithium ion secondary battery is lithium.

The positive electrode active material contains a lithium-containing compound, and the lithium-containing compound contains one or more of other elements (elements other than lithium) as constituent elements together with lithium. In this lithium-containing compound, main constituent elements are distributed such that the conditions relating to a specific concentration gradient are satisfied. A detailed configuration of this positive electrode active material (distribution of main constituent elements) will be described later.

The positive electrode binder contains, for example, one or more of synthetic rubber, polymer compounds, and the like. Examples of the synthetic rubber include styrene-butadiene-based rubber, fluororubber, and ethylene propylene diene. Examples of the polymer compounds include polyvinylidene fluoride, polyacrylic acid, and polyimide.

The positive electrode conductive agent contains, for example, one or more of carbon materials and the like. Examples of the carbon materials include graphite, carbon black, acetylene black, and Ketjen black. It is to be noted that the positive electrode conductive agent may be a metal material, a conductive polymer, or the like as long as the positive electrode conductive agent has electric conductivity.

Herein, the detailed configuration of the positive electrode active material (lithium-containing compound) will be described according to an embodiment.

Figure 2:
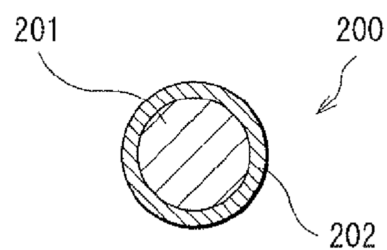
FIG. 2 is a cross-sectional view illustrating a configuration of a secondary battery-use positive electrode active material according to an embodiment of the present technology.

FIG. 2 illustrates a cross-sectional configuration of a positive electrode active material 200 applied to the positive electrode illustrated in FIG. 1. The positive electrode active material 200 includes a center portion 201 and a covering portion 202 provided on the surface of the center portion 201.

The center portion 201 is a main portion of the positive electrode active material 200 that substantially inserts and extracts the electrode reactant. The center portion 201 contains cobalt and an element M as constituent elements and, more specifically, contains a lithium composite oxide represented by the following formula (1).

$$Li_xCo_{1-y}M_yO_{2-z} \quad (1)$$

M is at least one element of magnesium, aluminum, boron, titanium, vanadium, chromium, iron, copper, zinc, molybdenum, tin, tungsten, zirconium, yttrium, niobium, calcium, strontium, bismuth, sodium, potassium, silicon, and phosphorus. x, y and z satisfy $0 \le x \le 1$, $0<y<0.5$ and $-0.1 \le z \le 0.2$.

The lithium composite oxide is an oxide containing cobalt and the element M as constituent elements together with lithium as is clear from the range of values that each of y and z can take.

The kind of the element M is not particularly limited as long as the element M is one or more of magnesium and the like described above. Among these, the element M is preferably magnesium. The reason for this is that, for example, when a positive electrode is used in a lithium ion secondary battery, since the ion radius of magnesium is substantially equal to the ion radius of lithium as an electrode reactant, the crystal structure of the positive electrode active material is stabilized during electrode reaction (particularly in a charged state).

Although the crystal structure of the lithium composite oxide is not particularly limited, a layered rock-salt type crystal structure is particularly preferable. The reason for this is that, in the secondary battery including the positive electrode, when the charge voltage increases, the chargeable/dischargeable capacity increases while the stability of the crystal structure of the positive electrode active material is secured.

The covering portion 202 is provided on a portion or whole of the surface of the center portion 201 in order to physically and chemically protect the center portion 201.

Naturally, when the covering portion 202 is provided on the portion of the surface of the center portion 201, the covering part 202 may exist at a plurality of places on the surface of the center portion 201. FIG. 2 illustrates the case where the covering portion 202 is provided on the whole of the surface of the center portion 201.

The covering portion 202 contains lithium, nickel, and manganese as constituent elements. That is, the covering portion 202 mainly contains, as constituent elements, elements (nickel and manganese) that are not contained as constituent elements in the center portion 201.

In the positive electrode active material 200, as described above, the main constituent elements are distributed such that the conditions relating to a specific concentration gradient are satisfied.

Specifically, in the positive electrode active material 200, the constituent elements (cobalt and element M) of the center portion 201 partially diffuse into the covering portion 202, and the constituent elements (nickel and manganese) of the covering portion 202 partially diffuse into the center portion 201.

Along with this, in the positive electrode active material 200, each of the main constituent elements (cobalt, element M, nickel, and manganese) is distributed such that the concentration has a gradient in a direction from the surface toward the center of the positive electrode active material 200. The concentration of each of cobalt, the element M, nickel, and manganese may increase or decrease in the direction from the surface toward the center of the positive electrode active material 200.

In the case where the main constituent elements (cobalt, element M, nickel, and manganese) are distributed such that the concentration gradient occurs in the positive electrode active material 200 as described above, the following three conditions are simultaneously satisfied with respect to the concentration gradient of the main constituent elements.

At a relatively shallow position in the direction from the surface toward the center of the positive electrode active material 200, the existing amount of the element M among the main constituent elements is set to fall within a specific range.

Specifically, a depth from the surface of the positive electrode active material 200 in the direction from the surface toward the center of the positive electrode active material 200 is defined by a proportion D (%), and the amount of the element M existing in the depth defined by the proportion D is defined by a molar fraction R. When the proportion D defines a depth corresponding to a position within the covering portion 202, the molar fraction R relating to the element M is optimized to fall within a specific range.

The proportion D is represented by the following formula (2). That is, the proportion D is a ratio occupied by the sum of the mass of cobalt, the mass of the element M, the mass of nickel, and the mass of manganese with respect to the mass of the positive electrode active material 200. The mass of the positive electrode active material 200 is the sum of the mass of the center portion 201 and the mass of the covering portion 202.

$$D\ (\%)=[(\text{mass of cobalt}+\text{mass of element M}+\text{mass of nickel}+\text{mass of manganese})/\text{mass of positive electrode active material 200}]\times 100 \quad (2)$$

The molar fraction R is represented by the following formula (3). That is, the molar fraction R is a ratio occupied by the amount of the element M with respect to the sum of the amount of cobalt, the amount of the element M, the amount of nickel, and the amount of manganese. The unit of the amount is mol.

$$R=\text{amount of element M}/(\text{amount of cobalt}+\text{amount of element M}+\text{amount of nickel}+\text{amount of manganese}) \quad (3)$$

More specifically, a first molar fraction satisfies $0.03<R<0.13$ at a first position within the covering portion 202 where the proportion D satisfies D=0.05.

At a relatively deep position in the direction from the surface toward the center of the positive electrode active material 200, the existing amount of the element M among the main constituent elements is set to fall within a specific range. That is, when the proportion D defines a depth corresponding to a position in the center portion 201, the molar fraction R relating to the element M is optimized to fall within a specific range.

Specifically, a second molar fraction satisfies $0.01<R<0.13$ at a second position within the center portion 201 where the proportion D satisfies D=0.3.

A ratio of the second molar fraction (D=0.3) to the first molar fraction (D=0.05), that is, a ratio F represented by the second molar fraction (D=0.3)/the first molar fraction R (D=0.05) satisfies $0.7\leq F\leq 1$.

The above three conditions are simultaneously satisfied with respect to the distribution (concentration gradient) of the main constituent elements of the positive electrode active material 200 because the distribution of the element M is optimized in the positive electrode active material 200. That is, the amount of the element M existing at a relatively shallow position (the position within the covering portion 202) from the surface of the positive electrode active material 200 is optimized, and the amount of the element M existing at a relatively deep position (the position within the center portion 201) from the surface of the positive electrode active material 200 is optimized. In addition, the concentration gradient of the element M between both the positions above is optimized.

In this case, while the center portion 201 is physically and chemically protected by the covering portion 202, the electrode reactant is likely to be inserted and extracted at the center portion 201. Thus, elution of the constituent element (for example, cobalt) of the center portion 201 is suppressed, and the electrode reactant is smoothly inserted and extracted in the positive electrode active material 200 while the thermal stability of the entire positive electrode active material 200 is secured.

In defining the appropriate range of the molar fraction R, attention is paid to the position within the covering portion 202 where the proportion D satisfies D=0.05 and the position within the center portion 201 where the proportion D satisfies D=0.3. The reason for this is that the amount of the element M existing at these positions (in other words, the diffusion state of the element M) is likely to affect the physical properties (such as performance and stability) of the positive electrode active material 200.

In order to examine the composition of each of the center portion 201 and the covering portion 202, each of the center portion 201 and the covering portion 202 may be analyzed using various element analysis methods. Examples of the element analysis methods include one or more of X-ray diffraction (XRD), time-of-flight secondary ion mass spectrometry (TOF-SIMS), high-frequency induction coupled plasma (ICP) emission spectrometry, Raman spectrometry, and energy dispersive X-ray spectrometry (EDX). In this case, a surface layer region (a portion of the covering portion 202) of the positive electrode active material 200 may be dissolved using an acid or the like.

In order to examine the proportion D and the molar fraction R, the following procedure may be performed, for example.

First, 0.2 g of the positive electrode active material 200 is charged into 10 ml (=10 $cm^3$) of 0.01 $mol/dm^3$ (=0.01 mol/l) hydrochloric acid (available from Kanto Chemical Co., Inc.), whereby a hydrochloric acid solution in which the positive electrode active material 200 is dispersed is obtained, and the hydrochloric acid solution is then stirred. Subsequently, hydrochloric acid solutions are sequentially taken every minute for 20 minutes after the positive electrode active material 200 is charged, and each of the hydrochloric acid solutions is then filtered using a filter (0.2 μm) to recover a solid content. The solid content is the positive electrode active material 200 partially dissolved with hydrochloric acid. Herein, it is assumed that the positive electrode active material 200 has a spherical shape, and that the positive electrode active material 200 is uniformly dissolved while maintaining a spherical shape in the direction from the surface toward the center of the positive electrode active material 200 as time elapses.

Subsequently, the hydrochloric acid solution after a series of filtration is analyzed using an ICP emission spectrophotometer (SPS 3100 sequential type ICP emission spectrophotometer manufactured by Hitachi High-Tech Science Corporation), whereby the concentration (mass/volume) of each of cobalt, the element M, nickel, and manganese dissolved with hydrochloric acid (released into the hydrochloric acid solution) as time elapses is measured. Subsequently, the mass and amount of each of cobalt, the element M, nickel, and manganese are calculated based on the concentration.

Finally, based on the mass and physical quantity described above, the conditions (elapsed time after the positive electrode active material 200 is charged) in which the proportion D satisfies D=0.05 and the proportion D satisfies D=0.3 are specified, and the molar fraction R in each of the conditions is specified.

The positive electrode active material layer 2 may contain the positive electrode active material that simultaneously satisfies the three conditions relating to the distribution of the main constituent elements described above and one or more of other positive electrode active materials that do not simultaneously satisfy the three conditions.

Examples of the other positive electrode active materials include lithium-containing compounds other than the above, and more specifically, lithium composite oxides and lithium phosphate compounds. This is because a high energy density can be obtained.

The "lithium composite oxide" is an oxide containing lithium and one or more of other elements (elements other than lithium) as constituent elements. The lithium-containing oxide has, for example, one or more crystal structures such as a layered rock-salt type crystal structure and a spinel type crystal structure.

The "lithium phosphate compound" is a phosphate compound containing lithium and one or more of other elements as constituent elements. The lithium-containing phosphate compound has, for example, one or more crystal structures such as an olivine type crystal structure.

The kind of the other element is not particularly limited as long as the other element is one or more of arbitrary elements (except for lithium). In particular, the other elements are preferably one or more of elements that belong to Groups 2 to 15 in the long-periodic table. More specifically, the other elements are more preferably one or more of metal elements of nickel, cobalt, manganese, iron, and the like. This is because a high voltage can be obtained.

Examples of the lithium composite oxide having the layered rock-salt type crystal structure include one or more of compounds represented by the following respective formulas (11) to (13).

$$Li_aMn_{(1-b-c)}Ni_bM1_cO_{(2-d)}F_e \quad (11)$$

M1 is at least one element of cobalt, magnesium, aluminum, boron, titanium, vanadium, chromium, iron, copper, zinc, zirconium, molybdenum, tin, calcium, strontium, and tungsten. "a" to "e" satisfy $0.8\leq a\leq 1.2$, $0<b<0.5$, $0\leq c\leq 0.5$, $(b+c)<1$, $-0.1\leq d\leq 0.2$, and $0\leq e\leq 0.1$. It is to be noted that the composition of lithium varies depending on charge and discharge states, and "a" is a value in a completely-discharged state.

$$Li_aNi_{(1-b)}M2_bO_{(2-c)}F_d \quad (12)$$

M2 is at least one element of cobalt, manganese, magnesium, aluminum, boron, titanium, vanadium, chromium, iron, copper, zinc, molybdenum, tin, calcium, strontium, and tungsten. "a" to "d" satisfy $0.8 \le a \le 1.2$, $0.005 < b < 0.5$, $-0.1 \le c \le 0.2$, and $0 \le d \ge 0.1$. It is to be noted that the composition of lithium varies depending on charge and discharge states, and "a" is a value in a completely-discharged state.

$$Li_aCo_{(1-b)}M3_bO_{(2-c)}F_d \quad (13)$$

M3 is at least one element of nickel, manganese, magnesium, aluminum, boron, titanium, vanadium, chromium, iron, copper, zinc, molybdenum, tin, calcium, strontium, and tungsten. "a" to "d" satisfy $0.8 \le a \le 1.2$, $0 \le b < 0.5$, $-0.1 \le c \le 0.2$, and $0 \le d \le 0.1$. It is to be noted that the composition of lithium varies depending on charge and discharge states, and "a" is a value in a completely-discharged state.

Examples of the lithium composite oxide having the layered rock-salt type crystal structure include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$.

In the case where the lithium composite oxide having the layered rock-salt type crystal structure contains, as constituent elements, nickel, cobalt, manganese, and aluminum, an atomic ratio of nickel is preferably not less than 50 at %. This is because a high energy density can be obtained.

Examples of the lithium composite oxide having the spinel type crystal structure include compounds represented by the following formula (14).

$$Li_aMn_{(2-b)}M4_bO_cF_d \quad (14)$$

M4 is at least one element of cobalt, nickel, magnesium, aluminum, boron, titanium, vanadium, chromium, iron, copper, zinc, molybdenum, tin, calcium, strontium, and tungsten. "a" to "d" satisfy $0.9 \le a \le 1.1$, $0 \le b \le 0.6$, $3.7 \le c \ge 4.1$, and $0 \le d \le 0.1$. It is to be noted that the composition of lithium varies depending on charge and discharge states, and "a" is a value in a completely-discharged state.

Examples of the lithium composite oxide having the spinel type crystal structure include $LiMn_2O_4$.

Examples of the lithium phosphate compound having the olivine type crystal structure include compounds represented by the following formula (15).

$$Li_aM5PO_4 \quad (15)$$

M5 is at least one element of cobalt, manganese, iron, nickel, magnesium, aluminum, boron, titanium, vanadium, niobium, copper, zinc, molybdenum, calcium, strontium, tungsten, and zirconium. "a" satisfies $0.9 \le a \le 1.1$. It is to be noted that the composition of lithium varies depending on charge and discharge states, and "a" is a value in a completely-discharged state.

Examples of the lithium-containing phosphate compound having the olivine type crystal structure include $LiFePO_4$, $LiMnPO_4$, $LiFe_{0.5}Mn_{0.5}PO_4$, and $LiFe_{0.3}Mn_{0.7}PO_4$.

The lithium composite oxide may be, for example, a compound represented by the following formula (16).

$$(Li_2MnO_3)_x(LiMnO_2)_{1-x} \quad (16)$$

x satisfies $0 \le x \le 1$.

In addition, the other positive electrode active materials may be, for example, an oxide, a disulfide, a chalcogenide, or a conductive polymer. Examples of the oxide include titanium oxide, vanadium oxide, and manganese dioxide. Examples of the disulfide include titanium disulfide and molybdenum sulfide. Examples of the chalcogenide include niobium selenide. Examples of the conductive polymer include sulfur, polyaniline, and polythiophene.

According to the positive electrode active material or the positive electrode, in the positive electrode active material including the center portion containing cobalt and the element M as constituent elements and the covering portion containing lithium, nickel, and manganese as constituent elements, the above three conditions are simultaneously satisfied with respect to the distribution (concentration gradient) of the main constituent elements (cobalt, element M, nickel, and manganese).

In this case, as described above, the distribution of the element M is optimized in the positive electrode active material 200. That is, the amount of the element M existing at a relatively shallow position (the position within the covering portion 202) in the positive electrode active material 200 and the amount of the element M existing at a relatively deep position (the position within the center portion 201) in the positive electrode active material 200 are optimized, and the concentration gradient of the element M between both the positions above is optimized. Consequently, the covering state of the center portion 201 covered with the main constituent elements (nickel and manganese) in the covering portion 202 is optimized, and the function of stabilizing the crystal structure of the positive electrode active material due to the main constituent element (element M) in the center portion 201 is effectively exerted. Thus, elution of the constituent element of the positive electrode active material is suppressed, and the electrode reactant is smoothly inserted and extracted in the positive electrode active material while the thermal stability of the entire positive electrode active material is secured, so that excellent battery characteristics can be obtained in the secondary battery including the positive electrode active material and the positive electrode containing the positive electrode active material.

In particular, when the element M is magnesium, the crystalline state of the positive electrode active material is stabilized during the electrode reaction, so that a higher effect can be obtained. In the secondary battery including the positive electrode, when the charge voltage increases, the chargeable/dischargeable capacity can be increased while the stability of the crystal structure of the positive electrode active material is secured as long as the lithium composite oxide has the layered rock-salt type crystal structure.

Next, description is given on a secondary battery including the positive electrode active material and the positive electrode described herein according to an embodiment.

Figure 3:
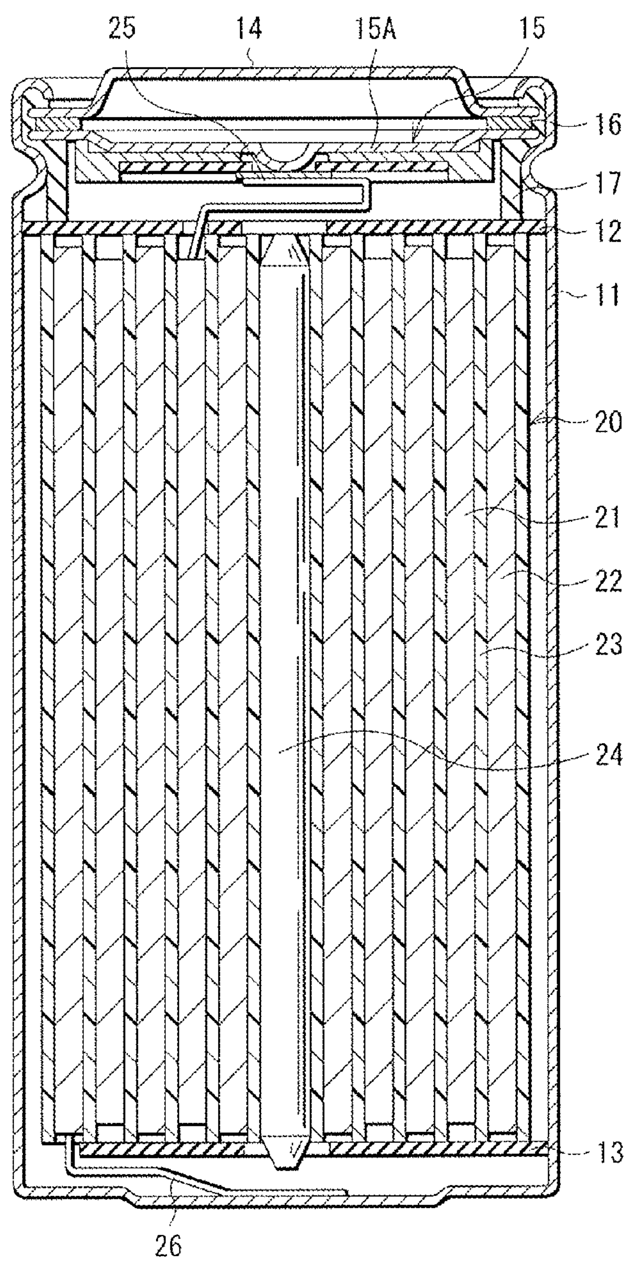
FIG. 3 is a cross-sectional view illustrating a configuration of a secondary battery (cylindrical-type) according to an embodiment of the present technology.
Figure 4:
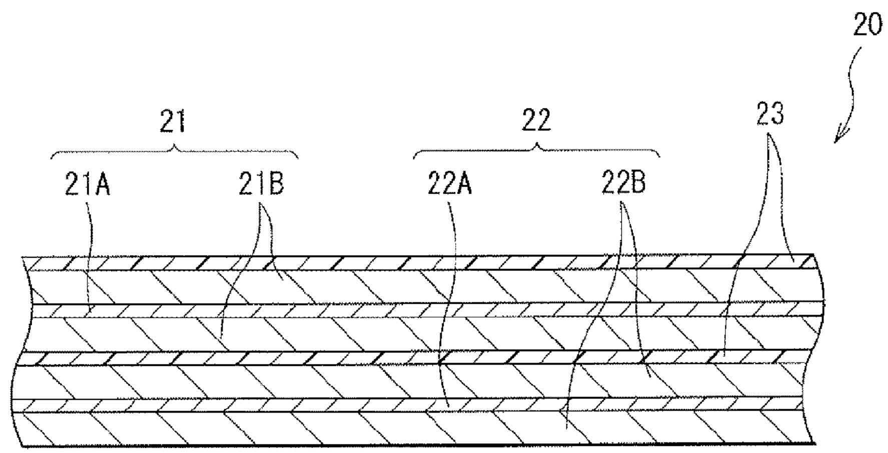
FIG. 4 is a partial cross-sectional view illustrating a configuration of portion of a spirally wound electrode body illustrated in FIG. 3.

FIG. 3 illustrates a cross-sectional configuration of a secondary battery, and FIG. 4 illustrates a partial cross-sectional configuration of a spirally wound electrode body 20 illustrated in FIG. 3.

The secondary battery described herein is, for example, a lithium-ion secondary battery in which a capacity of a negative electrode 22 is obtained by insertion and extraction of lithium as an electrode reactant.

The secondary battery has a cylindrical-type battery structure. For example, as illustrated in FIG. 3, the secondary battery contains a pair of insulating plates 12 and 13 and the spirally wound electrode body 20 as a battery element inside a battery can 11 in the shape of a substantially-hollow cylinder. In the spirally wound electrode body 20, for example, a positive electrode 21 and a negative electrode 22 stacked with a separator 23 interposed therebetween are spirally wound. The spirally wound electrode body 20 is, for example, impregnated with an electrolytic solution that is a liquid electrolyte.

The battery can 11 has a hollow structure in which one end thereof is closed and the other end thereof is open, and contains, for example, iron, one or more of aluminum, an alloy thereof, and any other material. A surface of the battery can 11 may be plated with, for example, nickel. The pair of insulating plates 12 and 13 is disposed to sandwich the spirally wound electrode body 20 in between and extend perpendicularly to a spirally wound periphery surface of the spirally wound electrode body 20.

At the open end of the battery can 11, a battery lid 14, a safety valve mechanism 15, and a positive temperature coefficient device (PTC device) 16 are swaged with a gasket 17. The battery can 11 is thus hermetically sealed. The battery lid 14 contains, for example, a material similar to the material of the battery can 11. Each of the safety valve mechanism 15 and the PTC device 16 is provided on the inner side of the battery lid 14, and the safety valve mechanism 15 is electrically coupled to the battery lid 14 through the PTC device 16. In the safety valve mechanism 15, when an internal pressure reaches a certain level or higher as a result of, for example, internal short circuit or heating from outside, a disk plate 15A inverts. This cuts electric connection between the battery lid 14 and the spirally wound electrode body 20. In order to prevent abnormal heat generation resulting from a large current, an electric resistance of the PTC device 16 increases as a temperature rises. The gasket 17 contains, for example, an insulating material, and a surface of the gasket 17 may be coated with asphalt.

For example, a center pin 24 is inserted in a space formed at the center of the spirally wound electrode body 20. However, the center pin 24 may be omitted. A positive electrode lead 25 is coupled to the positive electrode 21, and a negative electrode lead 26 is coupled to the negative electrode 22. The positive electrode lead 25 contains, for example, a conductive material such as aluminum. For example, the positive electrode lead 25 may be coupled to the safety valve mechanism 15 and electrically coupled to the battery lid 14. The negative electrode lead 26 contains a conductive material such as nickel. For example, the negative electrode lead 26 may be coupled to the battery can 11 and electrically coupled to the battery can 11.

The positive electrode 21 has the same configuration as that of the positive electrode according to an embodiment of the present technology described above. That is, the positive electrode 21 contains the positive electrode active material according to an embodiment of the present technology, and the above three conditions are simultaneously satisfied with respect to the distribution (concentration gradient) of the main constituent elements of the positive electrode active material.

The negative electrode 22 includes, for example, a negative electrode current collector 21A and a negative electrode active material layer 21B provided on the negative electrode current collector 21A.

The negative electrode active material layer 21B may be provided on only one surface or both surfaces of the negative electrode current collector 21A. FIG. 4 illustrates, for example, the case where the negative electrode active material layer 21B is provided on both surfaces of the negative electrode current collector 21A.

The negative electrode current collector 21A contains, for example, one or more conductive materials. The kind of the conductive material is not particularly limited; however, examples of the conductive material include metal materials such as copper, aluminum, nickel, and stainless steel, and an alloy containing two or more kinds of the metal materials may be used. The negative electrode current collector 21A may be configured of a single layer, or may be configured of multiple layers.

A surface of the negative electrode current collector 21A may be preferably roughened. This makes it possible to improve adhesiveness of the negative electrode active material layer 21B with respect to the negative electrode current collector 21A by a so-called anchor effect. In this case, it is enough that the surface of the negative electrode current collector 21A at least in a region facing the negative electrode active material layer 21B is roughened. Examples of the roughening method include a method of forming fine particles by utilizing electrolytic treatment. Through the electrolytic treatment, fine particles are formed on the surface of the negative electrode current collector 21A in an electrolytic bath by an electrolytic method to make the surface of the negative electrode current collector 21A rough. A copper foil fabricated by an electrolytic method is generally called "electrolytic copper foil."

The negative electrode active material layer 22B contains one or more of negative electrode materials capable of inserting and extracting lithium as a negative electrode active material. However, the negative electrode active material layer 22B may further contain one or more of materials such as a negative electrode binder and a negative electrode conductive agent. Details of the negative electrode binder and the negative electrode conductive agent are, for example, similar to those of the positive electrode binder and the positive electrode conductive agent.

However, the chargeable capacity of the negative electrode material is preferably larger than the discharge capacity of the positive electrode 21 for the purpose of preventing lithium metal from being unintentionally precipitated on the negative electrode 22 in the middle of charging. That is, the electrochemical equivalent of the negative electrode material capable of inserting and extracting lithium is preferably larger than the electrochemical equivalent of the positive electrode 21.

The negative electrode material is, for example, one or more of carbon materials. The carbon material causes an extremely-small change in a crystal structure thereof when lithium is inserted or extracted, which stably achieves high energy density. Further, the carbon material also serves as the negative electrode conductive agent, which improves conductivity of the negative electrode active material layer 22B.

Examples of the carbon material include graphitizable carbon, non-graphitizable carbon, and graphite. It is to be noted that a spacing of (002) plane in the non-graphitizable carbon is preferably not less than 0.37 nm, and a spacing of (002) plane in the graphite is preferably not more than 0.34 nm. More specific examples of the carbon material include pyrolytic carbons, cokes, glassy carbon fibers, an organic polymer compound fired body, activated carbon, and carbon blacks. Examples of the cokes include pitch coke, needle coke, and petroleum coke. The organic polymer compound fired body is obtained by firing (carbonizing) a polymer compound such as phenol resin and furan resin at appropriate temperature. Other than the materials mentioned above, the carbon material may be low crystalline carbon subjected to a heat treatment at temperature of about 1000° C. or lower, or may be amorphous carbon. The shape of the carbon material may be any of a fibrous shape, a spherical shape, a granular shape, and a scale-like shape.

Further, the negative electrode material is, for example, a material (metal-based material) containing one or more of metal elements and metalloid elements as constituent elements. This is because a high energy density can be obtained.

The metal-based material may be a simple substance, an alloy, or a compound, may be two or more thereof, or may have one or more phases thereof in part or all thereof. It is to be noted that the alloy also encompasses a material that contains one or more metal elements and one or more metalloid elements, in addition to a material configured of two or more metal elements. Further, the alloy may contain a non-metallic element. Examples of the structure of the metal-based material include a solid solution, a eutectic crystal (a eutectic mixture), an intermetallic compound, and a structure in which two or more thereof coexist.

The metal elements and the metalloid elements described above are, for example, one or more of metal elements and metalloid elements that are able to form an alloy with lithium. Specific examples thereof include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc, hafnium (Hf), zirconium, yttrium (Y), palladium (Pd), and platinum (Pt).

In particular, silicon or tin or both is preferable. The reason for this is that silicon and tin have a superior ability of inserting and extracting lithium, and therefore provide significantly high energy density.

A material that contains silicon, tin, or both as constituent elements may be any of a simple substance, an alloy, and a compound of silicon, may be any of a simple substance, an alloy, and a compound of tin, may be two or more thereof, or may be a material that has one or more phases thereof at least in part. The "simple substance" described herein merely refers to a simple substance in a general sense (in which a small amount of impurity may be contained), and does not necessarily refer to a simple substance having a purity of 100%.

The alloy of silicon contains, for example, one or more of elements such as tin, nickel, copper, iron, cobalt, manganese, zinc, indium, silver, titanium, germanium, bismuth, antimony, and chromium, as constituent elements other than silicon. The compound of silicon contains, for example, one or more of elements such as carbon and oxygen as constituent elements other than silicon. The compound of silicon contains, for example, one or more of the elements described related to the alloy of silicon, as constituent elements other than silicon.

Specific examples of the alloy of silicon and the compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq 2$), and LiSiO. v in $SiO_v$ may be $0.2<v<1.4$.

The alloy of tin contains, for example, one or more of elements such as silicon, nickel, copper, iron, cobalt, manganese, zinc, indium, silver, titanium, germanium, bismuth, antimony, and chromium, as constituent elements other than tin. The compound of tin contains, for example, one or more of elements such as carbon and oxygen as constituent elements other than tin. The compound of tin contains for example, one or more of the elements described related to the alloy of tin, as constituent elements other than tin.

Specific examples of the alloy of tin and the compound of tin include $SnO_w$ ($0<w\leq 2$), $SnSiO_3$, LiSnO, and $Mg_2Sn$.

In particular, the material containing tin as a constituent element is preferably, for example, a material (Sn-containing material) that contains, together with tin as a first constituent element, a second constituent element and a third constituent element. The second constituent element includes, for example, one or more of elements such as cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, and silicon. The third constituent element includes, for example, one or more of elements such as boron, carbon, aluminum, and phosphorus (P). The Sn-containing material containing the second constituent element and the third constituent element makes it possible to achieve, for example, high battery capacity and superior cycle characteristics.

In particular, the Sn-containing material is preferably a material (a SnCoC-containing material) that contains tin, cobalt, and carbon as constituent elements. In the SnCoC-containing material, for example, a content of carbon is from 9.9 mass % to 29.7 mass %, and a ratio of contents of tin and cobalt (Co/(Sn+Co)) is from 20 mass % to 70 mass %. This is because a high energy density can be obtained.

The SnCoC-containing material preferably has a phase that contains tin, cobalt, and carbon, and the phase is preferably low crystalline or amorphous. The phase is a phase (reaction phase) capable of reacting with lithium, and therefore existence of the reaction phase results in achievement of superior characteristics. Naturally, the reaction phase may include a low crystalline portion and an amorphous portion. A half width (a diffraction angle 2θ) of a diffraction peak obtained by X-ray diffraction of this reaction phase may be preferably 1° or larger in the case where a CuKα ray is used as a specific X-ray, and an insertion rate is 1°/min. This makes it possible to insert and extract lithium more smoothly in the SnCoC-containing material, and to decrease reactivity of the SnCoC-containing material with the electrolytic solution. In some cases, the SnCoC-containing material may include a phase that contains simple substances of the respective constituent elements or part thereof in addition to the low-crystalline phase or the amorphous phase.

For example, comparison between X-ray diffraction charts before and after an electrochemical reaction with lithium makes it possible to easily determine whether the diffraction peak obtained by the X-ray diffraction corresponds to the reaction phase that is able to react with lithium. Specifically, for example, if a position of the diffraction peak after the electrochemical reaction with lithium is changed from the position of the diffraction peak before the electrochemical reaction with lithium, the obtained diffraction peak corresponds to the reaction phase that is able to react with lithium. In this case, for example, the diffraction peak of the low-crystalline reaction phase or the amorphous reaction phase is seen in a range of $2\theta=20°$ to $50°$. Such a reaction phase includes, for example, the respective constituent elements described above, and it is considered that such a reaction phase has become low crystalline or amorphous mainly because of existence of carbon.

In the SnCoC-containing material, part or all of carbon that is the constituent element thereof is preferably bound to a metal element or a metalloid element that is another constituent element thereof. This is because cohesion or crystallization of, for example, tin is suppressed. It is possible to confirm a binding state of the elements, for example, by an X-ray photoelectron spectroscopy method (XPS). In a commercially available device, for example, an Al—Kα ray or a Mg-Kα ray is used as a soft X-ray. In the case where part or all of carbon are bound to a metal element, a metalloid element, or the like, the peak of a synthetic wave of is orbit of carbon (Cis) appears in a region lower than 284.5 eV. It is assumed that energy calibration is made so that the peak of 4f orbit of a gold atom (Au4f) is obtained at 84.0 eV. At this time, in general, since surface contamination carbon exists on the material surface, the peak of C1s of the surface contamination carbon is regarded as 284.8 eV, and this peak is used as energy standard. In XPS measurement, the waveform of the peak of C1s is obtained as a form including the peak of the surface contamination carbon and the peak of carbon in the SnCoC-containing material. The two peaks may be therefore separated from each other, for example, by analysis with use of commercially-available software. In the analysis of the waveform, the position of the main peak existing on the lowest bound energy side is set to the energy reference (284.8 eV).

The SnCoC-containing material is not limited to the material (SnCoC) that contains only tin, cobalt, and carbon as constituent elements The SnCoC-containing material may further contain, for example, one or more of elements such as silicon, iron, nickel, chromium, indium, niobium, germanium, titanium, molybdenum, aluminum, phosphorus, gallium, and bismuth, as constituent elements, in addition to tin, cobalt, and carbon.

Other than the SnCoC-containing material, a material (a SnCoFeC-containing material) that contains tin, cobalt, iron, and carbon as constituent elements is also preferable. Any composition of the SnCoFeC-containing material may be adopted. To give an example, in the case where a content of iron is set smaller, a content of carbon is from 9.9 mass % to 29.7 mass %, a content of iron is from 0.3 mass % to 5.9 mass %, and a ratio of contents of tin and cobalt (Co/(Sn+Co)) is from 30 mass % to 70 mass %. Alternatively, in the case where the content of iron is set larger, the content of carbon is from 11.9 mass % to 29.7 mass %, the ratio of contents of tin, cobalt, and iron ((Co+Fe)/(Sn+Co+Fe)) is from 26.4 mass % to 48.5 mass %, and the ratio of contents of cobalt and iron (Co/(Co+Fe)) is from 9.9 mass % to 79.5 mass %. Such composition ranges allow for achievement of high energy density. Physical characteristics (such as a half width) of the SnCoFeC-containing material are similar to physical characteristics of the foregoing SnCoC-containing material.

Other than the materials mentioned above, the negative electrode material may be, for example, one or more of a metal oxide, a polymer compound, and the like. Examples of the metal oxide include iron oxide, ruthenium oxide, and molybdenum oxide. Examples of the polymer compound include polyacetylene, polyaniline, and polypyrrole.

In particular, the negative electrode material preferably contains both the carbon material and the metal-based material for the following reasons.

The metal-based material, in particular, the material containing one or both of silicon and tin as constituent elements has a concern that such a material is easily and radically expanded or contracted at the time of charge and discharge, whereas such a material has an advantage of high theoretical capacity. In contrast, the carbon material has an advantage that the carbon material is less prone to be expanded or contracted at the time of charge and discharge, whereas the carbon material has a concern of low theoretical capacity. Accordingly, using both the carbon material and the metal-based material makes it possible to suppress expansion and contraction during charging and discharging while achieving high theoretical capacity (in other words, high battery capacity).

The negative electrode active material layer 22B is formed by, for example, one or more of a coating method, a gas phase method, a liquid phase method, a spraying method, and a firing method (sintering method). The coating method is a method in which, for example, after a particulate (powder) negative electrode active material is mixed with a negative electrode binder and the like, the mixture is dispersed in an organic solvent, and the negative electrode current collector 21A is coated with the resultant. Examples of the gas phase method include a physical deposition method and a chemical deposition method. More specifically, examples thereof include vacuum evaporation method, sputtering method, ion plating method, laser ablation method, thermal chemical vapor deposition method, chemical vapor deposition (CVD) method, and plasma chemical vapor deposition method. Examples of the liquid phase method include electrolytic plating method and electroless plating method. The spraying method is a method in which a negative electrode active material in a fused state or a semi-fused state is sprayed onto the surface of the negative electrode current collector 21A. The firing method is, for example, a method in which after the negative electrode current collector 21A is coated with the mixture dispersed in, for example, the organic solvent by the coating method, the mixture is subjected to heat treatment at a temperature higher than the melting point of the negative electrode binder or the like. Examples of the firing method include atmosphere firing method, reactive firing method, and hot press firing method.

In the secondary battery, as described above, the electrochemical equivalent of the negative electrode material capable of inserting and extracting lithium is larger than the electrochemical equivalent of the positive electrode for the purpose of preventing lithium from being unintentionally precipitated on the negative electrode 21 in the middle of charge. Further, in the case where an open circuit voltage (that is, a battery voltage) in a completely-charged state is not less than 4.25 V, an extraction amount of lithium per unit mass is larger than that in the case where the open circuit voltage is 4.20 V, even if the same positive electrode active material is used, and therefore amounts of the positive electrode active material and the negative electrode active material are adjusted in accordance therewith. Accordingly, high energy density is obtained.

The separator 23 is disposed between the positive electrode 21 and the negative electrode 22. Accordingly, the separator 23 separates the positive electrode 21 from the negative electrode 22, and passes lithium ions therethrough while preventing current short circuit resulting from contact of the positive electrode 21 and the negative electrode 22.

The separator 23 contains, for example, one or more of porous films made of synthetic resin, ceramics, or the like. The separator 23 may be a laminated film in which two or more porous films are stacked. Examples of the synthetic resin include polytetrafluoroethylene, polypropylene, and polyethylene.

The separator 23 may include, for example, the foregoing porous film (base material layer) and a polymer compound layer provided on the base material layer. The reason for this is that, this allows for an improvement in adhesiveness of the separator 23 with respect to each of the positive electrode 21 and the negative electrode 22, thereby suppressing deformation of the spirally wound electrode body 20. This makes it possible to suppress decomposition reaction of the electrolytic solution and to suppress liquid leakage of the electrolytic solution with which the base material layer is impregnated. Accordingly, resistance is less prone to increase even if charge and discharge are repeated, and swollenness of secondary battery is suppressed.

The polymer compound layer may be provided on a single surface or both surfaces of the base material layer. The polymer compound layer contains, for example, one or more of polymer materials such as polyvinylidene fluoride. This is because polyvinylidene fluoride has superior physical strength and is electrochemically stable. When the polymer compound layer is formed, for example, the base material layer is coated with a solution prepared by dissolving the polymer material in, for example, an organic solvent, and thereafter, the base material layer is dried. Alternatively, the base material layer may be immersed in the solution, and thereafter the base material layer may be dried.

The electrolytic solution contains, for example, one or more of solvents and one or more of electrolyte salts. The electrolytic solution may further contain one or more of various materials such as additives.

The solvent contains a non-aqueous solvent such as an organic solvent. The electrolytic solution containing the non-aqueous solvent is a so-called non-aqueous electrolytic solution.

Examples of the solvent include a cyclic carbonate ester, a chain carbonate ester, lactone, a chain carboxylic ester, and nitrile (mononitrile). The solvents make it possible to achieve, for example, superior battery capacity, superior cycle characteristics, and superior storage characteristics.

Examples of the cyclic carbonate ester include ethylene carbonate, propylene carbonate, and butylene carbonate. Examples of the chain carbonate ester include dimethyl carbonate, diethyl carbonate, ethylmethyl carbonate, and methylpropyl carbonate. Examples of the lactone include γ-butyrolactone and γ-valerolactone. Examples of the chain carboxylic ester include methyl acetate, ethyl acetate, methyl propionate, ethyl propionate, propyl propionate, methyl butyrate, methyl isobutyrate, methyl trimethylacetate, and ethyl trimethylacetate. Examples of the nitrile include acetonitrile, methoxyacetonitrile, and 3-methoxypropionitrile.

Other than the materials mentioned above, examples of the solvent include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. These solvents make it possible to achieve similar advantages.

In particular, one or more of carbonate ester such as ethylene carbonate, propylene carbonate, dimethyl carbonate, diethyl carbonate, and ethyl methyl carbonate are preferable. These materials make it possible to achieve, for example, further superior battery capacity, further superior cycle characteristics, and further superior storage characteristics.

In this case, a combination of a high-viscosity (high dielectric constant) solvent (having, for example, specific dielectric constant $\varepsilon \geq 30$) as cyclic carbonate ester such as ethylene carbonate and propylene carbonate and a low-viscosity solvent (having, for example, viscosity ≤1 mPa·s) as chain carbonate ester such as dimethyl carbonate, ethylmethyl carbonate, and diethyl carbonate is more preferable. The combination makes it possible to improve the dissociation property of the electrolyte salt and ion mobility.

The solvent may be an unsaturated cyclic carbonate ester, a halogenated carbonate ester, a sulfonate ester, an acid anhydride, a dinitrile compound, a diisocyanate compound, or the like. This makes it possible to improve the chemical stability of the electrolytic solution.

The unsaturated cyclic carbonate ester is a cyclic carbonate ester having one or more unsaturated bonds (carbon-carbon double bonds). Examples of the unsaturated cyclic carbonate ester include vinylene carbonate (1,3-dioxole-2-one), vinylethylene carbonate (4-vinyl-1,3-dioxolan-2-one), and methyleneethylene carbonate (4-methylene-1,3-dioxolan-2-one). A content of the unsaturated cyclic carbonate ester in the solvent is not particularly limited; however, the content is, for example, from 0.01 wt % to 10 wt %.

The halogenated carbonate ester is a cyclic carbonate ester having one or more halogens as constituent elements or a chain carbonate ester having one or more halogens as constituent elements. The kind of halogen is not particularly limited; however, halogen is, for example, one or more of fluorine, chlorine, bromine and iodine. Examples of the cyclic halogenated carbonate ester include 4-fluoro-1,3-dioxolan-2-one and 4,5-difluoro-1,3-dioxolan-2-one. Examples of the chain halogenated carbonate ester include fluoromethyl methyl carbonate, bis(fluoromethyl) carbonate, and difluoromethyl methyl carbonate. A content of the halogenated carbonate ester in the solvent is not particularly limited; however, the content is, for example, from 0.01 wt % to 50 wt %.

Examples of the sulfonate ester include a monosulfonate ester and a disulfonate ester. The monosulfonate ester may be a cyclic monosulfonate ester or a chain monosulfonate ester. Examples of the cyclic monosulfonate ester include sultones such as 1,3-propane sultone and 1,3-propene sultone. Examples of the chain monosulfonate ester include a compound in which a cyclic monosulfonate ester is cleaved at a middle site. The disulfonate ester may be a cyclic disulfonate ester or a chain disulfonate ester. A content of the sulfonate ester in the solvent is not particularly limited; however, the content is, for example, from 0.5 wt % to 5 wt %.

Examples of the acid anhydride include carboxylic anhydride, disulfonic anhydride, and carboxylic-sulfonic anhydride. Examples of the carboxylic anhydride include succinic anhydride, glutaric anhydride, and maleic anhydride. Examples of the disulfonic anhydride include ethanedisulfonic anhydride and propanedisulfonic anhydride. Examples of the carboxylic-sulfonic anhydride include sulfobenzoic anhydride, sulfopropionic anhydride, and sulfobutyric anhydride. A content of the acid anhydride in the solvent is not particularly limited; however, the content is, for example, from 0.5 wt % to 5 wt %.

Examples of the dinitrile compound include a compound represented by $NC—C_mH_{2m}—CN$ (m is an integer of 1 or more). Examples of the dinitrile compound include succinonitrile ($NC—C_2H_4—CN$), glutaronitrile ($NC—C_3H_6—CN$), adiponitrile ($NC—C_4H_8—CN$), and phthalonitrile ($NC—C_6H_4—CN$). A content of the dinitrile compound in the solvent is not particularly limited; however, the content is, for example, from 0.5 wt % to 5 wt %.

Examples of the diisocyanate compound include a compound represented by $OCN—C_nH_{2n}—NCO$ (n is an integer of 1 or more). Examples of the diisocyanate compound include $OCN—C_6H_{12}—NCO$. A content of the diisocyanate compound in the solvent is not particularly limited; however, the content is, for example, from 0.5 wt % to 5 wt %.

The electrolyte salt contains, for example, one or more of lithium salts. However, the electrolyte salt may contain a salt other than the lithium salt. Examples of the salt other than the lithium salt include a light metal salt other than lithium.

Examples of the lithium salts include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). These lithium salts make it possible to achieve, for example, superior battery capacity, superior cycle characteristics, and superior storage characteristics.

In particular, one or more of lithium hexafluorophosphate, lithium tetrafluoroborate, lithium perchlorate, and lithium hexafluoroarsenate are preferable, and lithium hexafluorophosphate is more preferable. These lithium salts make it possible to lower internal resistance, thereby achieving a higher effect.

A content of the electrolyte salt is not particularly limited; however, the content is preferably from 0.3 mol/kg to 3.0 mol/kg with respect to the solvent. High ion conductivity is achievable in this range.

The secondary battery operates, for example, as follows.

When the secondary battery is charged, lithium ions are extracted from the positive electrode 21, and the lithium ions are inserted in the negative electrode 22 through the electrolytic solution. On the other hand, when the secondary battery is discharged, lithium ions are extracted from the negative electrode 22, and the lithium ions are inserted in the positive electrode 21 through the electrolytic solution.

The secondary battery is manufactured, for example, by the following procedure.

When fabricating the positive electrode 21, first, the positive electrode active material, the positive electrode binder, and the positive electrode conductive agent are mixed to obtain a positive electrode mixture. Subsequently, the positive electrode mixture is dispersed in, for example, an organic solvent to obtain paste positive electrode mixture slurry. Finally, both surfaces of the positive electrode current collector 21A are coated with the positive electrode mixture slurry, and thereafter, the coated positive electrode mixture slurry is dried to form the positive electrode active material layer 21B. Thereafter, the positive electrode active material layer 21B may be compression-molded with use of, for example, a roll pressing machine. In this case, the positive electrode active material layer 21B may be heated, or may be compression-molded a plurality of times.

When fabricating the negative electrode 22, the negative electrode active material layer 22B may be formed on both surfaces of the negative electrode current collector 22A by a procedure similar to the foregoing procedure of fabricating the positive electrode 21. That is, a negative electrode mixture containing the negative electrode active material, the negative electrode binder, and the negative electrode conductive agent may be dispersed in, for example, an organic solvent to obtain paste negative electrode mixture slurry. Both surfaces of the negative electrode current collector 22A may be coated with the negative electrode mixture slurry, and thereafter, the coated negative electrode mixture slurry is dried to form the negative electrode active material layer 22B. Thereafter, the negative electrode active material layer 22B may be compression-molded with use of, for example, a roll pressing machine.

In the case where the secondary battery is assembled, the positive electrode lead 25 is coupled to the positive electrode current collector 21A by, for example, a welding method, and the negative electrode lead 26 is coupled to the negative electrode current collector 22A by, for example, a welding method. Subsequently, the positive electrode 21 and the negative electrode 22 stacked with the separator 23 interposed therebetween are spirally wound to form the spirally wound electrode body 20. Subsequently, the center pin 24 is inserted in the space formed at the center of the spirally wound electrode body 20.

Subsequently, the spirally wound electrode body 20 is sandwiched between the pair of insulating plates 12 and 13, and is contained inside the battery can 11. In this case, the positive electrode lead 25 is coupled to the safety valve mechanism 15 by, for example, a welding method, and the negative electrode lead 26 is coupled to the battery can 11 by, for example, a welding method. Subsequently, the electrolytic solution may be injected inside the battery can 11, and the spirally wound electrode body 20 may be impregnated with the injected electrolytic solution. Finally, the battery lid 14, the safety valve mechanism 15, and the PTC device 16 are swaged with the gasket 17 at the open end of the battery can 11. Thus, the cylindrical-type secondary battery is completed.

According to the cylindrical type secondary battery, since the positive electrode 21 has the same configuration as that of the positive electrode according to an embodiment of the present technology described above, the positive electrode 21 contains the positive electrode active material according to an embodiment of the present technology. Thus, excellent battery characteristics can be obtained. Action and effects other than those described above are as described above.

Figure 5:
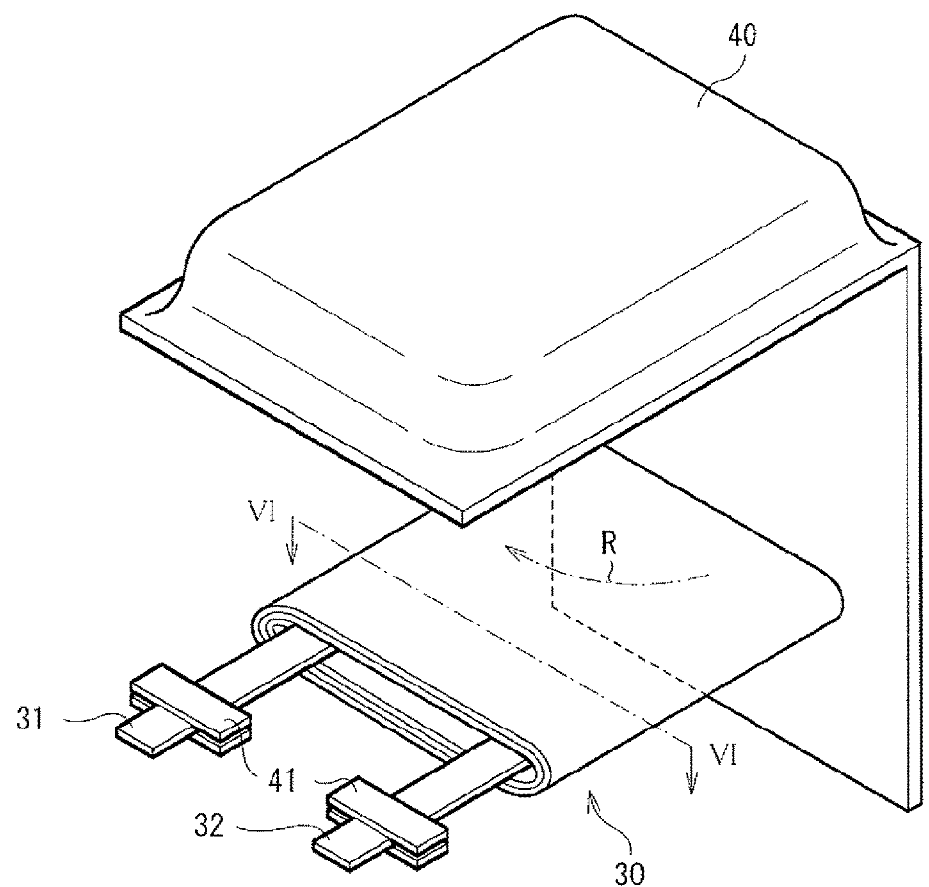
FIG. 5 is a perspective view illustrating a configuration of another secondary battery (laminated-film-type) according to the embodiment of the present technology.
Figure 6:
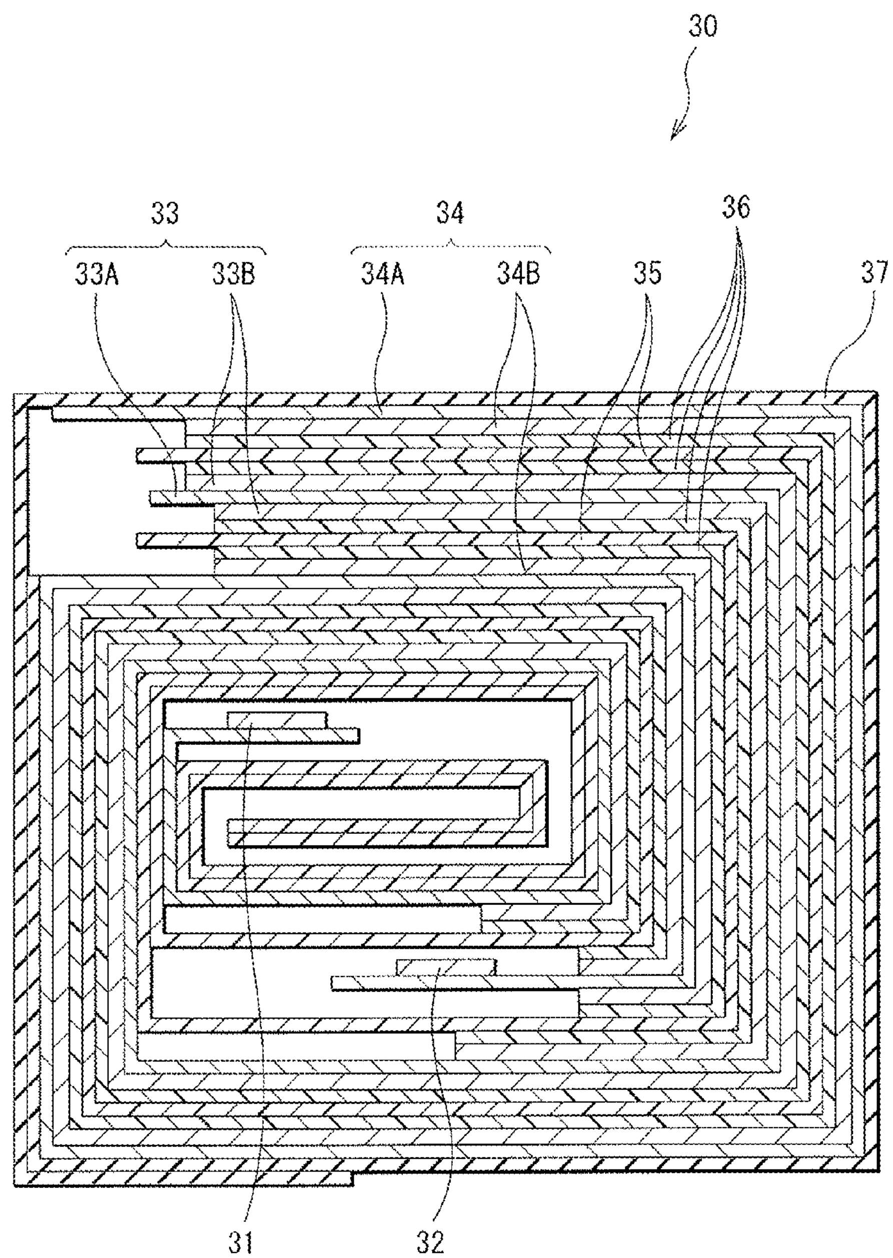
FIG. 6 is a cross-sectional view taken along a line VI-VI of the spirally wound electrode body illustrated in FIG. 5.

FIG. 5 illustrates a perspective configuration of another secondary battery, and FIG. 6 illustrates a cross section taken along a line VI-VI of a spirally wound electrode body 30 illustrated in FIG. 5. FIG. 5 illustrates a state that the spirally wound electrode body 30 is separated from an outer package member 40.

In the following description, the components of the cylindrical-type secondary battery that have been already described are cited where appropriate.

The secondary battery is a lithium ion secondary battery having a laminated-film-type battery structure. In the secondary battery, for example, as illustrated in FIG. 5, the spirally wound electrode body 30 as a battery element is contained inside the film-like outer package member 40. In the spirally wound electrode body 30, for example, a positive electrode 33 and a negative electrode 34 stacked with a separator 35 and an electrolyte layer 36 interposed therebetween are spirally wound. A positive electrode lead 31 is coupled to the positive electrode 33, and a negative electrode lead 32 is coupled to the negative electrode 34. An outermost periphery of the spirally wound electrode body 30 is protected by a protective tape 37.

Each of the positive electrode lead 31 and the negative electrode lead 32 is led out from inside to outside of the outer package member 40 in a same direction, for example. The positive electrode lead 31 contains, for example, one or more of conductive materials such as aluminum. The negative electrode lead 32 contains, for example, one or more of electrically-conductive materials such as copper, nickel, and stainless steel. These electrically-conductive materials have a thin-plate shape or a mesh shape, for example.

The outer package member 40 is, for example, one film that is foldable in a direction of an arrow R illustrated in FIGS. 5 and 6, and the outer package member 40 has a depression for containing of the spirally wound electrode body 30 in part thereof. The outer package member 40 is a laminated film in which a fusion-bonding layer, a metal layer, and a surface protective layer are stacked in this order, for example. In a process of manufacturing the secondary battery, the outer package member 40 is folded such that portions of the fusion-bonding layer face each other with the spirally wound electrode body 30 interposed therebetween, and outer edges of the portions of the fusion-bonding layer are fusion-bonded. Alternatively, two laminated films bonded to each other by, for example, an adhesive may form the outer package member 40. The fusion-bonding layer includes, for example, one or more of films of polyethylene, polypropylene, and other materials. The metal layer includes, for example, one or more of an aluminum foil and the like. The surface protective layer includes, for example, one or more of films of nylon, polyethylene terephthalate, and other materials.

In particular, the outer package member 40 is preferably an aluminum laminated film in which a polyethylene film, an aluminum foil, and a nylon film are stacked in this order. However, the outer package member 40 may be a laminated film having any other laminated structure, a polymer film such as polypropylene, or a metal film.

For example, an adhesive film 41 is inserted between the outer package member 40 and the positive electrode lead 31 in order to prevent entrance of the outside air. Moreover, for example, the foregoing adhesive film 41 is inserted between the outer package member 40 and the negative electrode lead 32. The adhesive film 41 contains one or more materials having adhesiveness to both the positive electrode lead 31 and the negative electrode lead 32. Examples of the material having adhesiveness include polyolefin resin, and more specific examples thereof include polyethylene, polypropylene, modified polyethylene, and modified polypropylene.

The positive electrode 33 includes, for example, a positive electrode current collector 33A and a positive electrode active material layer 33B. The negative electrode 34 includes a negative electrode current collector 34A and a negative electrode active material layer 34B. The configuration of each of the positive electrode current collector 33A, the positive electrode active material layer 33B, the negative electrode current collector 34A, and the negative electrode active material layer 34B is the same as the configuration of each of the positive electrode current collector 21A, the positive electrode active material layer 21B, the negative electrode current collector 22A, and the negative electrode active material layer 22B. The configuration of the separator 35 is, for example, similar to that of the separator 23.

The electrolyte layer 36 contains an electrolytic solution and a polymer compound. This electrolytic solution has the same configuration as that of the electrolytic solution used for the foregoing cylindrical-type secondary battery. The electrolyte layer 36 described herein is a so-called gel electrolyte in which an electrolytic solution is held by a polymer compound. The gel electrolyte achieves high ion conductivity (for example, 1 mS/cm or higher at room temperature), and prevents liquid leakage of the electrolytic solution. The electrolyte layer 36 may further contain one or more of other materials such as additives.

The polymer compound includes one or more of homopolymers and copolymers. Examples of the homopolymer include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethylmethacrylate, polyacrylic acid, polymethacrylic acid, styrene-butadiene rubber, nitrile-butadiene rubber, polystyrene, and polycarbonate. The copolymer is, for example, a copolymer of vinylidene fluoride and hexafluoropropylene. In particular, polyvinylidene fluoride is preferable as a homopolymer, and a copolymer of vinylidene fluoride and hexafluoropylene is preferable as a copolymer. Such a homopolymer and a copolymer are electrochemically stable.

In the electrolyte layer 36 as a gel electrolyte, the "solvent" contained in the electrolytic solution refers to a wide concept including not only a liquid solvent but also a material having ion conductivity capable of dissociating the electrolyte salt. Thus, when a polymer compound having ion conductivity is used, the polymer compound is also included in the solvent.

The electrolytic solution may be used as it is instead of the electrolyte layer 36. In this case, the spirally wound electrode body 30 is impregnated with the electrolytic solution.

The secondary battery operates, for example, as follows.

When the secondary battery is charged, lithium ions are extracted from the positive electrode 33, and the lithium ions are inserted in the negative electrode 34 through the electrolyte layer 36. On the other hand, when the secondary battery is discharged, lithium ions are extracted from the negative electrode 34, and the lithium ions are inserted in the positive electrode 33 through the electrolyte layer 36.

The secondary battery including the gel electrolyte layer 36 may be manufactured, for example, by one of the following three procedures.

In the first procedure, the positive electrode 33 and the negative electrode 34 are fabricated by a fabrication procedure similar to that of the positive electrode 21 and the negative electrode 22. Specifically, when the positive electrode 33 is fabricated, the positive electrode active material layer 33B is formed on both surfaces of the positive electrode current collector 33A, and when the negative electrode 34 is fabricated, the negative electrode active material layer 34B is formed on both surfaces of the negative electrode current collector 34A. Subsequently, the electrolytic solution, the polymer compound, an organic solvent and the like are mixed to prepare a precursor solution. Subsequently, the positive electrode 33 is coated with the precursor solution, and the coated precursor solution is dried to form the gel electrolyte layer 36. Moreover, the negative electrode 34 is coated with the precursor solution, and the coated precursor solution is dried to form the gel electrolyte layer 36. Subsequently, the positive electrode lead 31 is coupled to the positive electrode current collector 33A by, for example, a welding method, and the negative electrode lead 32 is coupled to the negative electrode current collector 34A by, for example, a welding method. Subsequently, the positive electrode 33 and the negative electrode 34 stacked with the separator 35 and the electrolyte layer 36 interposed therebetween are spirally wound to form the spirally wound electrode body 30. Subsequently, the protective tape 37 is attached onto the outermost periphery of the spirally wound electrode body 30. Subsequently, the outer package member 40 is folded to interpose the spirally wound electrode body 30, and thereafter, the outer edges of the outer package member 40 are bonded by, for example, a thermal fusion bonding method to enclose the spirally wound electrode body 30 in the outer package member 40. In this case, the adhesive film 41 is inserted between the positive electrode lead 31 and the outer package member 40, and the adhesive film 41 is inserted between the negative electrode lead 32 and the outer package member 40.

In the second procedure, the positive electrode lead 31 is coupled to the positive electrode 33 by, for example, a welding method, and the negative electrode lead 32 is coupled to the negative electrode 34 by, for example, a welding method. Subsequently, the positive electrode 33 and the negative electrode 34 stacked with the separator 35 interposed therebetween are spirally wound to fabricate a spirally wound body as a precursor of the spirally wound electrode body 30. Subsequently, the protective tape 37 is attached onto the outermost periphery of the spirally wound body. Subsequently, the outer package member 40 is folded to interpose the spirally wound electrode body 30, and thereafter, the outer edges other than one side of the outer package member 40 are bonded by, for example, a thermal fusion bonding method, whereby the spirally wound body is contained inside the pouch-like outer package member 40. Subsequently, the electrolytic solution, monomers that are raw materials of the polymer compound, a polymerization initiator, and, as necessary, other materials such as a polymerization inhibitor are mixed to prepare a composition for electrolyte. Subsequently, the composition for electrolyte is injected into the pouch-like outer package member 40, and thereafter, the pouch-like outer package member 40 is hermetically sealed by, for example, a thermal fusion bonding method. Subsequently, the monomer is thermally polymerized, and thereby, a polymer compound is formed. Accordingly, the electrolytic solution is held by the polymer compound to form the gel electrolyte layer 36.

In the third procedure, the spirally wound body is fabricated, and then contained inside the pouch-like outer package member 40 in a manner similar to that of the foregoing second procedure, except that the separator 35 provided with the polymer compound layer formed on a porous film (base material layer) is used. Subsequently, the electrolytic solution is injected into the outer package member 40, and thereafter, an opening of the outer package member 40 is hermetically sealed by, for example, a thermal fusion bonding method. Subsequently, the outer package member 40 is heated while a weight is applied to the outer package member 40 to cause the separator 35 to be closely attached to the positive electrode 33 with the polymer compound layer interposed therebetween and to be closely attached to the negative electrode 34 with the polymer compound layer interposed therebetween. Accordingly, the polymer compound layer is impregnated with the electrolytic solution, and the polymer compound layer is gelated, thus forming the electrolyte layer 36.

In the third procedure, swollenness of the secondary battery is suppressed more than in the first procedure. Further, in the third procedure, for example, the solvent and the monomers (the raw materials of the polymer compound) are hardly left in the electrolyte layer 36, as compared with the second procedure, and therefore, the formation process of the polymer compound is favorably controlled. Thus, each of the positive electrode 33, the negative electrode 34, and the separator 35 is sufficiently and closely attached to the electrolyte layer 36.

According to the secondary battery, since the positive electrode 33 has the same configuration as that of the positive electrode according to an embodiment of the present technology described above, the positive electrode 33 contains the positive electrode active material according to an embodiment of the present technology. Thus, excellent battery characteristics can be obtained. Action and effects other than those described above are as described above.

The secondary battery described here is a cylindrical-type lithium metal secondary battery in which the capacity of the negative electrode 22 is obtained by precipitation and dissolution of lithium metal. The secondary battery has a configuration similar to that of the foregoing cylindrical-type lithium-ion secondary battery, and is manufactured by a similar procedure, except that the negative electrode active material layer 22B is formed of the lithium metal.

In the secondary battery, the lithium metal is used as a negative electrode active material, and high energy density is thereby achievable. The negative electrode active material layer 22B may already exist at the time of assembling. Alternatively, the negative electrode active material layer 22B may not exist at the time of assembling and may be formed of lithium metal precipitated during charging. Further, it is possible that the negative electrode active material layer 22B is used as a current collector, and the negative electrode current collector 22A is omitted.

The secondary battery operates, for example, as follows. When the secondary battery is charged, lithium ions are extracted from the positive electrode 21, and the lithium ions are precipitated as the lithium metal on the surface of the negative electrode current collector 22A through the electrolytic solution. On the other hand, when the secondary battery is discharged, lithium metal is eluted as lithium ions into the electrolytic solution from the negative electrode active material layer 22B, and is inserted in the positive electrode 21 through the electrolytic solution.

According to the lithium metal secondary battery, since the positive electrode 21 has the same configuration as that of the positive electrode according to an embodiment of the present technology described above, the positive electrode 21 contains the positive electrode active material according to an embodiment of the present technology. Thus, excellent battery characteristics can be obtained. Action and effects other than those described above are as described above.

The configuration of the lithium metal secondary battery described herein can be applied to not only the cylindrical-type secondary battery, but also the laminated-film-type secondary battery. Even in this case, similar effects are achievable.

Next, description is given on application examples of the foregoing secondary battery.

Applications of a secondary battery are not particularly limited as long as the secondary battery is applied to a machine, a device, an appliance, an apparatus, a system (collective entity of a plurality of devices and the like), or the like that is capable of using the secondary battery as a driving electric power source, an electric power storage source for electric power accumulation, or the like. The secondary battery used as an electric power source may be a main electric power source, or may be an auxiliary electric power source. The main electric power source is an electric power source used preferentially regardless of the presence or absence of other power sources. The auxiliary electric power source may be, for example, an electric power source used instead of the main electric power source or an electric power source used by being switched from the main electric power source as necessary. When the secondary battery is used as the auxiliary electric power source, the kind of the main electric power source is not limited to the secondary battery.

Examples of applications of the secondary battery include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof include a mobile lifestyle electric appliance such as an electric shaver; a storage device such as a backup electric power source and a memory card; an electric power tool such as an electric drill and an electric saw; a battery pack used as an attachable and detachable electric power source of, for example, a notebook personal computer; a medical electronic apparatus such as a pacemaker and a hearing aid; an electric vehicle such as an electric automobile (including a hybrid automobile); and an electric power storage system such as a home battery system for accumulation of electric power for, for example, emergency. It goes without saying that the secondary battery may be employed for an application other than the applications described above.

In particular, the secondary battery is effectively applicable to the battery pack, the electric vehicle, the electric power storage system, the electric power tool, the electronic apparatus, or the like. The reason for this is that since superior battery characteristics are demanded in these applications, performance can be effectively improved with use of the secondary battery of the present technology. The battery pack is an electric power source including the secondary battery. As will be described later, the battery pack may include a single battery or an assembled battery. The electric vehicle is a vehicle that works (runs) with use of the secondary battery as a driving electric power source, and as described above, the electric vehicle may be an automobile (such as a hybrid automobile) including a drive source other than the secondary battery. The electric power storage system is a system including the secondary battery as an electric power storage source. For example, in a home electric power storage system, electric power is accumulated in the secondary battery as an electric power storage source, and therefore, home electric products and the like can be used using the electric power. The electric power tool is a tool in which a movable section (such as a drill) is allowed to move with use of the secondary battery as a driving electric power source. The electronic apparatus is an apparatus executing various functions with use of the secondary battery as a driving electric power source (electric power supply source).

Herein, specific description is given on some application examples of the secondary battery. The configurations of the application examples explained below are merely examples, and may be changed as appropriate.

Figure 7:
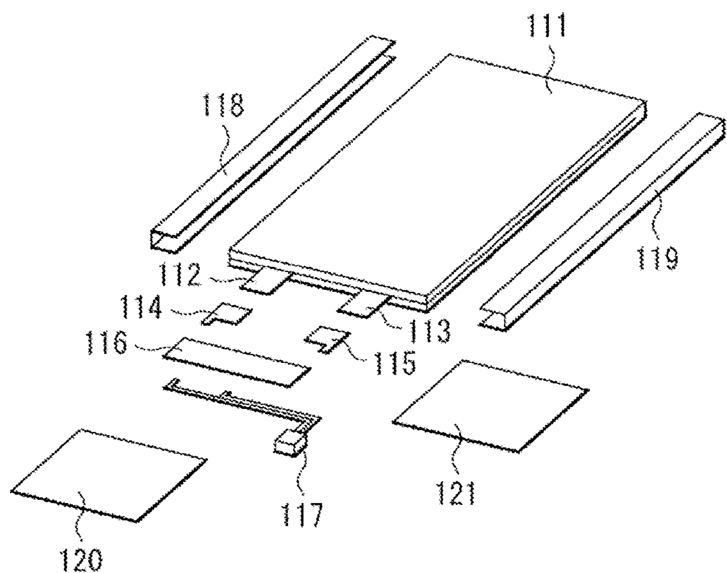
FIG. 7 is a perspective view illustrating a configuration of an application example (a battery pack: single battery) of the secondary battery according to the embodiment of the present technology.
Figure 8:
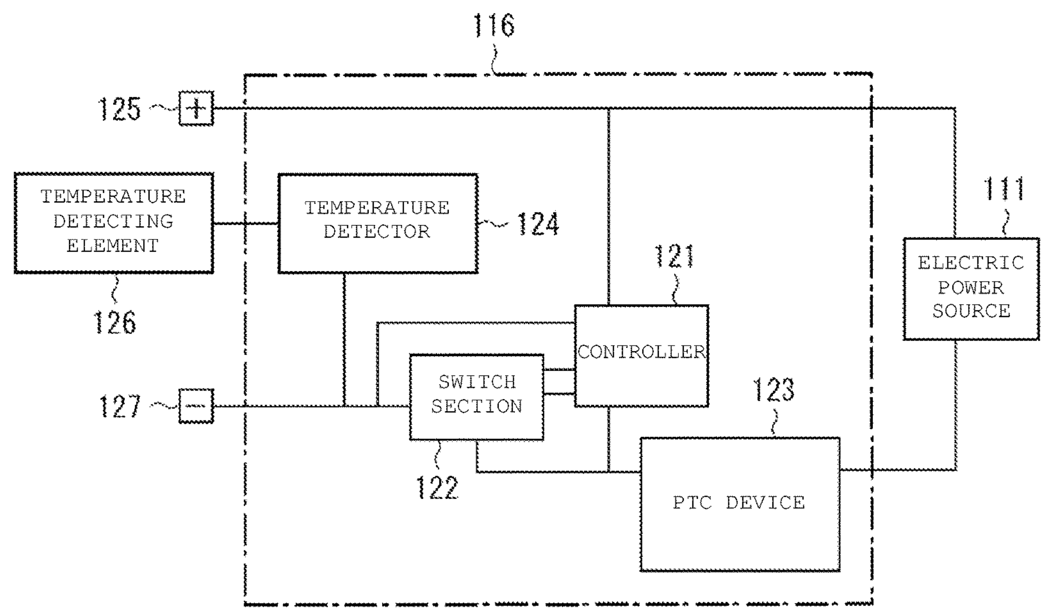
FIG. 8 is a block diagram illustrating a configuration of the battery pack illustrated in FIG. 7.

FIG. 7 illustrates a perspective configuration of a battery pack including a single battery, and FIG. 8 illustrates a block configuration of the battery pack illustrated in FIG. 7. FIG. 7 illustrates a state that the battery pack is disassembled.

The battery back described herein is a simple battery pack including the secondary battery of the present technology (a so-called soft pack), and is mounted in, for example, an electronic apparatus typified by a smartphone. For example, the battery pack includes an electric power source 111 that is a laminated-film-type secondary battery, and a circuit board 116 coupled to the electric power source 111, as illustrated in FIG. 7. A positive electrode lead 112 and a negative electrode lead 113 are attached to the electric power source 111.

A pair of adhesive tapes 118 and 119 is attached to both side surfaces of the electric power source 111. A protection circuit module (PCM) is formed in the circuit board 116. The circuit board 116 is coupled to the positive electrode 112 through a tab 114, and is coupled to a negative electrode lead 113 through a tab 115. Moreover, the circuit board 116 is coupled to a lead 117 provided with a connector for external connection. While the circuit board 116 is coupled to the electric power source 111, the circuit board 116 is protected by a label 120 and an insulating sheet 121. The label 120 is attached to fix, for example, the circuit board 116 and the insulating sheet 121.

Moreover, for example, the battery pack includes the electric power source 111 and the circuit board 116 as illustrated in FIG. 8. The circuit board 116 includes, for example, a controller 121, a switch section 122, a PTC device 123, and a temperature detector 124. The electric power source 111 is allowed to be coupled to outside through a positive electrode terminal 125 and a negative electrode terminal 127, so that the electric power source 111 is charged and discharged through the positive electrode terminal 125 and the negative electrode terminal 127. The temperature detector 124 detects a temperature with use of a temperature detection terminal (a so-called T terminal) 126.

The controller 121 controls an operation of the entire battery pack (including a used state of the electric power source 111). The controller 121 includes, for example, a central processing unit (CPU) and a memory.

For example, in the case where a battery voltage reaches an overcharge detection voltage, the controller 121 causes the switch section 122 to be disconnected so that a charge current does not flow into a current path of the electric power source 111. Moreover, for example, in the case where a large current flows during charging, the controller 121 causes the switch section 122 to be disconnected, thereby blocking the charge current.

On the other hand, for example, in the case where a battery voltage reaches an overdischarge detection voltage, the controller 121 causes the switch section 122 to be disconnected so that a discharge current does not flow into a current path of the electric power source 111. Moreover, for example, in the case where a large current flows during discharging, the controller 121 causes the switch section 122 to be disconnected, thereby blocking the discharge current.

The overcharge detection voltage is, for example, 4.2 V±0.05 V, and the overdischarge detection voltage is, for example, 2.4 V±0.1 V.

The switch section 122 switches the used state of the electric power source 111, that is, whether or not the electric power source 111 is allowed to be coupled to an external device in accordance with an instruction from the controller 121. The switch section 122 includes, for example, a charge control switch and a discharge control switch. The charge control switch and the discharge control switch are each, for example, a semiconductor switch such as a field-effect transistor (MOSFET) using a metal oxide semiconductor. Charge and discharge currents are detected based on on-resistance of the switch section 122.

The temperature detector 124 measures a temperature of the electric power source 111, and outputs a measurement result of the temperature to the controller 121. The temperature detector 124 includes, for example, a temperature detecting element such as a thermistor. The measurement result of the temperature measured by the temperature detector 124 is used, for example, in the case where the controller 121 performs charge and discharge control at the time of abnormal heat generation and in the case where the controller 121 performs a correction process at the time of calculating remaining capacity.

The circuit board 116 may not include the PTC device 123. In this case, a PTC device may be separately attached to the circuit board 116.

Figure 9:
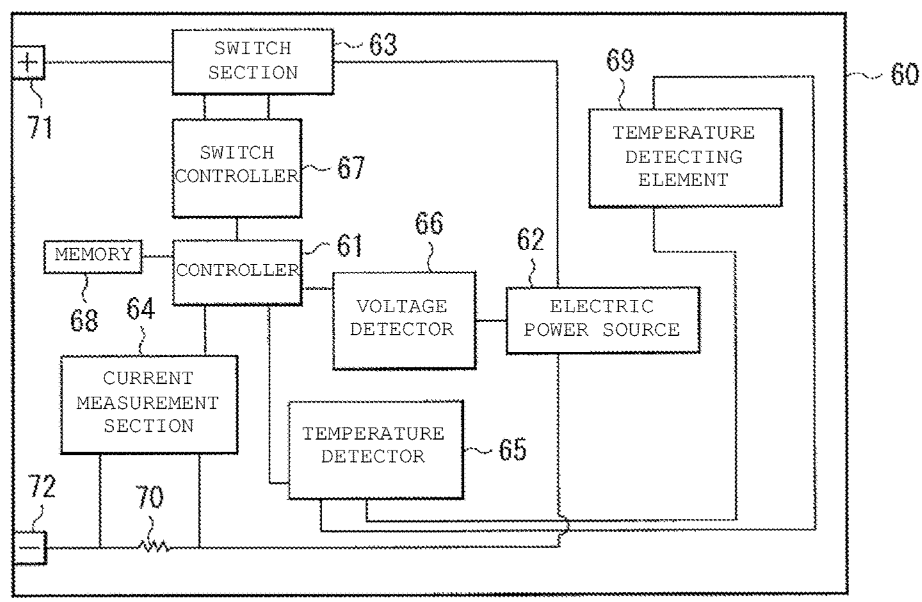
FIG. 9 is a block diagram illustrating a configuration of an application example (a battery pack: assembled battery) of the secondary battery according to the embodiment of the present technology.

FIG. 9 illustrates a block configuration of a battery pack including an assembled battery.

For example, the battery pack includes a controller 61, an electric power source 62, a switch section 63, a current measurement section 64, a temperature detector 65, a voltage detector 66, a switch controller 67, a memory 68, a temperature detecting element 69, a current detection resistance 70, a positive electrode terminal 71, and a negative electrode terminal 72 in a housing 60. The housing 60 contains, for example, a plastic material.

The controller 61 controls an operation of the entire battery pack (including a used state of the electric power source 62). The controller 61 includes, for example, a CPU. The electric power source 62 is an assembled battery including two or more secondary batteries of the present technology, and the two or more secondary batteries may be connected in series, in parallel, or in series-parallel combination. As an example, the electric power source 62 includes six secondary batteries in which two sets of series-connected three batteries are connected in parallel to each other.

The switch section 63 switches the used state of the electric power source 62, that is, whether or not the electric power source 62 is allowed to be coupled to an external device, in accordance with an instruction of the controller 61. The switch section 63 includes, for example, a charge control switch, a discharge control switch, a charging diode, and a discharging diode. The charge control switch and the discharge control switch are each, for example, a semiconductor switch such as a field-effect transistor (MOSFET) using a metal oxide semiconductor.

The current measurement section 64 measures a current with use of the current detection resistance 70, and outputs a measurement result of the current to the controller 61. The temperature detector 65 measures temperature with use of the temperature detection element 69, and outputs a measurement result of the temperature to the controller 61. The measurement result of the temperature is used, for example, in the case where the controller 61 performs charge and discharge control at the time of abnormal heat generation and in the case where the controller 61 performs a correction process at the time of calculating remaining capacity. The voltage detector 66 measures a voltage of the secondary battery in the electric power source 62, performs analog-to-digital conversion on the measured voltages, and supplies the resultant to the controller 61.

The switch controller 67 controls an operation of the switch section 63 in accordance with signals inputted respectively from the current measurement section 64 and the voltage detector 66.

For example, in the case where a battery voltage reaches an overcharge detection voltage, the switch controller 67 causes the switch section 63 (charge control switch) to be disconnected so that a charge current does not flow into a current path of the electric power source 62. This makes it possible to perform only discharge through the discharging diode in the electric power source 62. For example, when a large current flows during charging, the switch controller 67 blocks the charging current.

For example, in the case where a battery voltage reaches an overdischarge detection voltage, the switch controller 67 causes the switch section 63 (discharge control switch) to be disconnected so that a discharge current does not flow into a current path of the electric power source 62. This makes it possible to perform only charge through the charging diode in the electric power source 62. For example, when a large current flows during discharging, the switch controller 67 blocks the discharging current.

The overcharge detection voltage is, for example, 4.2 V±0.05 V, and the overdischarge detection voltage is, for example, 2.4 V±0.1 V.

The memory 68 includes, for example, an EEPROM as a non-volatile memory. The memory 68 holds, for example, numerical values calculated by the controller 61 and information of the secondary battery measured in a manufacturing process (such as an internal resistance in an initial state). In the case where the memory 68 holds full charge capacity of the secondary battery, the controller 61 is allowed to comprehend information such as remaining capacity.

The temperature detection element 69 measures a temperature of the electric power source 62, and outputs a measurement result of the temperature to the controller 61. The temperature detection element 69 includes, for example, a thermistor.

The positive electrode terminal 71 and the negative electrode terminal 72 are terminals coupled to an external device (such as a notebook personal computer) driven using the battery pack or an external device (such as a battery charger) used for charging the battery pack. The electric power source 62 is charged and discharged through the positive electrode terminal 71 and the negative electrode terminal 72.

Figure 10:
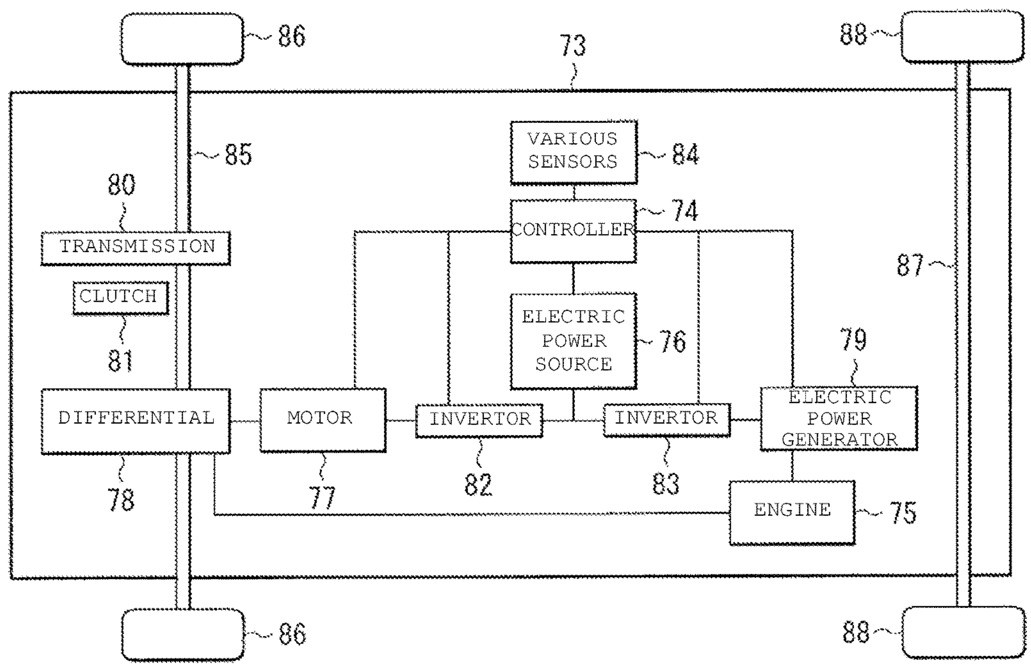
FIG. 10 is a block diagram illustrating a configuration of an application example (an electric vehicle) of the secondary battery according to the embodiment of the present technology.

FIG. 10 illustrates a block configuration of a hybrid automobile as an example of an electric vehicle.

For example, the electric vehicle includes a controller 74, an engine 75, an electric power source 76, a driving motor 77, a differential 78, an electric power generator 79, a transmission 80, a clutch 81, inverters 82 and 83, and various sensors 84 inside a housing 73 made of metal. Other than the components mentioned above, the electric vehicle includes, for example, a front drive shaft 85 and a front tire 86 that are coupled to the differential 78 and the transmission 80, and a rear drive shaft 87, and a rear tire 88.

The electric vehicle can be run with use of one of the engine 75 and the motor 77 as a drive source, for example. The engine 75 is a main power source, and is, for example, a petrol engine. In the case where the engine 75 is used as a power source, drive power (torque) of the engine 75 is transferred to the front tire 86 or the rear tire 88 through the differential 78, the transmission 80, and the clutch 81 as drive sections, for example. Since the torque of the engine 75 is transferred to the electric power generator 79, the electric power generator 79 generates alternating-current electric power with use of the torque, and since the alternating-current electric power is converted into direct-current electric power through the inverter 83, the direct-current electric power is accumulated in the electric power source 76. In contrast, in the case where the motor 77 as a conversion section is used as a power source, electric power (direct-current electric power) supplied from the electric power source 76 is converted into alternating-current electric power through the inverter 82, and therefore, the motor 77 is driven with use of the alternating-current electric power. Drive power (torque) obtained by converting the electric power by the motor 77 is transferred to the front tire 86 and the rear tire 88 through the differential 78, the transmission 80, and the clutch 81 as the drive sections, for example.

When speed of the electric vehicle is reduced by a brake mechanism, resistance at the time of speed reduction is transferred to the motor 77 as torque, and thus the motor 77 may generate alternating-current electric power by utilizing the torque. It is preferable that the alternating-current electric power be converted into direct-current electric power through the inverter 82, and thus the direct-current regenerative electric power be accumulated in the electric power source 76.

The controller 74 controls an operation of the entire electric vehicle. The controller 74 includes, for example, a CPU. The electric power source 76 includes one or more secondary batteries of the present technology. The electric power source 76 is coupled to an external power source, and the power source 76 is allowed to accumulate electric power by receiving electric power supply from the external electric power source. The various sensors 84 are used, for example, for controlling the number of revolutions of the engine 75 and for controlling opening level (throttle opening level) of a throttle valve. The various sensors 84 include, for example, one or more of a speed sensor, an acceleration sensor, and an engine frequency sensor.

The description has been given above on a case where the electric vehicle is the hybrid automobile; however, the electric vehicle may be a vehicle (an electric automobile) that works with use of only the electric power source 76 and the motor 77 without using the engine 75.

Figure 11:
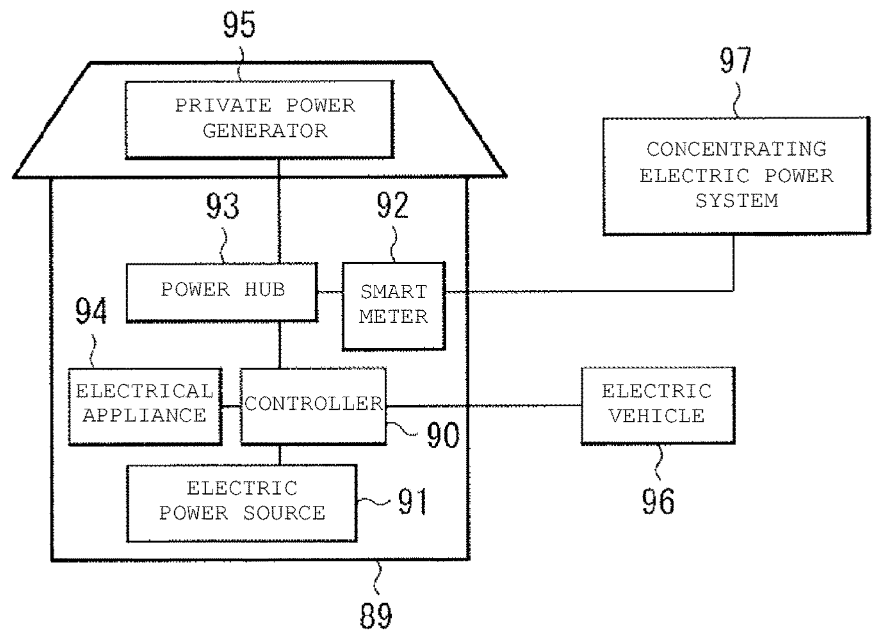
FIG. 11 is a block diagram illustrating a configuration of an application example (an electric power storage system) of the secondary battery according to the embodiment of the present technology.

FIG. 11 illustrates a block configuration of an electric power storage system.

For example, the electric power storage system includes a controller 90, an electric power source 91, a smart meter 92, and a power hub 93 inside a house 89 such as a general residence or a commercial building.

In this case, the electric power source 91 may be coupled to, for example, an electrical appliance 94 provided inside the house 89, and may be allowed to be coupled to an electric vehicle 96 parked outside the house 89. Further, for example, the electric power source 91 may be coupled to a private power generator 95 provided in the house 89 through the power hub 93, and may be allowed to be coupled to an outside concentrating electric power system 97 through the smart meter 92 and the power hub 93.

The electrical appliance 94 includes, for example, one or more home electric products such as a refrigerator, an air conditioner, a television, and a water heater. The private power generator 95 includes, for example, one or more of a solar power generator, a wind-power generator, and the like. The electric vehicle 96 includes, for example, one or more of an electric automobile, an electric motorcycle, a hybrid automobile, and the like. The concentrating electric power system 97 includes, for example, one or more of a thermal power plant, an atomic power plant, a hydraulic power plant, a wind-power plant, and the like.

The controller 90 controls an operation of the entire electric power storage system (including a used state of the electric power source 91). The controller 90 includes, for example, a CPU. The electric power source 91 includes one or more secondary batteries of the present technology. The smart meter 92 is, for example, an electric power meter that is compatible with a network and is provided in the house 89 demanding electric power, and may be communicable with an electric power supplier. Accordingly, for example, while the smart meter 92 communicates with outside, the smart meter 92 controls the balance between supply and demand in the house 89, which allows for effective and stable energy supply.

In the electric power storage system, for example, electric power may be accumulated in the electric power source 91 from the concentrating electric power system 97 as an external electric power source through the smart meter 92 and the power hub 93, and electric power is accumulated in the electric power source 91 from the private power generator 95 as an independent electric power source through the power hub 93. The electric power accumulated in the electric power source 91 is supplied to the electrical appliance 94 and the electric vehicle 96 in accordance with an instruction from the controller 90, so that the electrical appliance 94 becomes operable, and the electric vehicle 96 becomes chargeable. In other words, the electric power storage system is a system that makes it possible to accumulate and supply electric power in the house 89 with use of the electric power source 91.

The electric power accumulated in the electric power source 91 is usable as required. Thus, for example, electric power is accumulated in the electric power source 91 from the concentrating electric power system 97 in the middle of night when an electric rate is inexpensive, and the electric power accumulated in the electric power source 91 may be used during daytime hours when the electric rate is expensive.

The foregoing electric power storage system may be provided for each household (family unit), or may be provided for a plurality of households (a plurality of family units).

Figure 12:
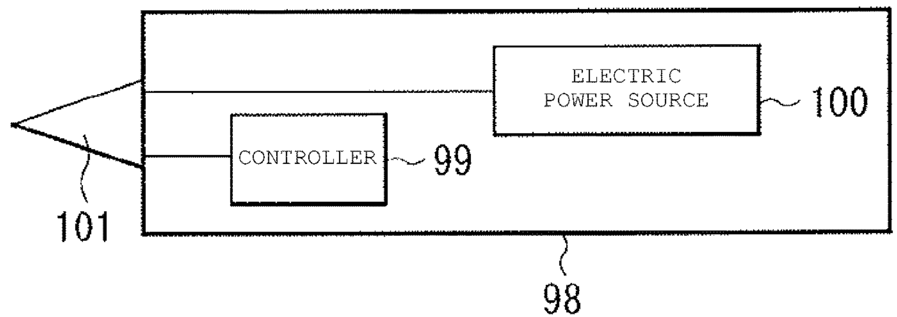
FIG. 12 is a block diagram illustrating a configuration of an application example (an electric power tool) of the secondary battery according to the embodiment of the present technology.

FIG. 12 illustrates a block configuration of an electric power tool.

The electric power tool described herein is, for example, an electric drill. The electric power tool includes, for example, a controller 99 and an electric power source 100 inside a tool body 98. For example, a drill section 101 as a movable section is attached to the tool body 98 in an operable (rotatable) manner.

The tool body 98 contains, for example, a plastic material. The controller 99 controls an operation of the entire electric power tool (including a used state of the electric power source 100). The controller 99 includes, for example, a CPU. The electric power source 100 includes one or more secondary batteries of the present technology. The controller 99 allows electric power to be supplied from the electric power source 100 to the drill section 101 in accordance with an operation by an operation switch.

EXAMPLES

Examples according to embodiments of the present technology is further described below.

Experimental Examples 1 to 14

First, a positive electrode active material was produced by the following procedure.

First, lithium carbonate ($Li_2CO_3$), cobalt oxide ($CO_3O_4$), and magnesium carbonate ($MgCO_3$) were mixed to obtain a mixture. Subsequently, the mixture was fired in a stream of dry air with use of an alumina crucible to obtain a powder. In this case, the mixing ratio (molar ratio) of lithium, cobalt, and magnesium was set to 1.01:0.985:0.015.

As a result of studying the composition of this powder, the composition (average chemical composition) was $Li_{0.97}CoMg_{0.15}O_2$. That is, a lithium composite oxide (center portion) containing, as a constituent element, magnesium as an element M was obtained. An average particle size of the lithium composite oxide measured by a laser scattering method was 20 μm, and a specific surface area of the lithium composite oxide was 0.3 $m^2/g$.

Subsequently, 100 parts by mass of the lithium composite oxide was charged to 3000 parts by mass of an aqueous lithium hydroxide (LiOH) solution (temperature=80° C.), and the aqueous lithium hydroxide solution was then stirred (stirring time=1 hour), thus obtaining an aqueous dispersion solution. In this case, as shown in Table 1, the concentration (N) of the aqueous lithium hydroxide solution was adjusted.

Subsequently, an aqueous nitric acid solution was obtained by dissolving nickel nitrate ($Ni(NO_3)_2.6H_2O$) and manganese nitrate ($Mn(NO_3)_2.6H_2O$) in 100 parts by mass of pure water. In this case, as shown in Table 1, the mixing ratio (parts by mass) of nickel nitrate and the mixing ratio (parts by mass) of manganese nitrate were adjusted.

Subsequently, the aqueous nitric acid solution was gradually added to the aqueous dispersion solution to obtain a mixed solution. In this case, the time from the start of the addition of the aqueous nitric acid solution to the completion of the addition was set to 2 hours. Subsequently, nickel nitrate and manganese nitrate were dispersed in the mixed solution by stirring the mixed solution (temperature=80° C., stirring time=1 hour), and the mixed solution was then cooled. Subsequently, the mixed solution was filtered, and then the solid obtained by the filtration was dried (drying temperature=120° C.) to obtain a precursor.

Subsequently, in order to adjust the amount of lithium, 100 parts by mass of the precursor was added to 150 parts by mass of an aqueous lithium carbonate solution (concentration=2 N), thereby impregnating the precursor with the aqueous lithium carbonate solution. Subsequently, the precursor impregnated with the aqueous lithium carbonate solution was dried to obtain a firing precursor.

Finally, the firing precursor was fired in an electric furnace and then cooled to form a covering portion containing lithium, nickel, and manganese as constituent elements. In this case, as shown in Table 1, the firing speed (° C./min), the firing temperature (° C.), the firing time (hour(s)), the cooling rate (° C./min), and the cooling temperature (° C.) were adjusted.

Consequently, the covering portion was formed on the surface of the center portion, and the main constituent elements (cobalt, magnesium, nickel, and manganese) were distributed so as to have a concentration gradient, so that a positive electrode active material was completed.

In order to examine the distribution of the main constituent elements of the positive electrode active material, the proportion D (D=0.05 and D=0.3) was specified using the foregoing method, and the molar fraction R and the ratio F were calculated based on the proportion D, so that the results shown in Table 2 were obtained. The "increase/decrease" shown in Table 2 represents how the molar fraction R has gradients, based on a magnitude relationship between the molar fraction R (proportion D=0.05) and the molar fraction R (proportion D=0.3). That is, the case where the molar fraction R (proportion D=0.3) is less than the molar fraction R (proportion D=0.05) is indicated as "decrease", and the case where the molar fraction R (proportion D=0.3) is more than the molar fraction R (proportion D=0.05) is indicated as "increase".

TABLE 1

| Experimental | Concentration (N) | Mixing ratio (part(s) by mass) | | Firing rate | Firing temperature | Firing time | Cooling rate | Cooling temperature |
|---|---|---|---|---|---|---|---|---|
| Example | LiOH | $Ni(NO_3)_2 \cdot 6H_2O$ | $Mn(NO_3)_2 \cdot 6H_2O$ | (° C./min) | (° C.) | (hour(s)) | (° C./min) | (° C.) |
| 1 | 5 | 2.99 | 2.79 | 5 | 950 | 5 | 7 | 150 |
| 2 | 2 | 2.99 | 2.79 | 5 | 850 | 5 | 7 | 150 |
| 3 | 2 | 2.99 | 2.79 | 5 | 750 | 5 | 7 | 150 |
| 4 | 2 | 4.98 | 4.65 | 5 | 750 | 5 | 7 | 150 |
| 5 | 2 | 1.00 | 0.93 | 5 | 850 | 5 | 7 | 150 |
| 6 | 2 | 4.98 | 4.65 | 5 | 750 | 5 | 7 | 150 |
| 7 | 2 | 1.00 | 0.93 | 5 | 750 | 5 | 7 | 150 |
| 8 | 5 | 4.98 | 4.65 | 5 | 950 | 5 | 20 | 150 |
| 9 | 2 | 2.99 | 2.79 | 5 | 750 | 1 | 7 | 150 |
| 10 | 2 | 4.98 | 4.65 | 5 | 750 | 3 | 7 | 150 |
| 11 | 2 | 6.98 | 6.51 | 5 | 950 | 5 | 7 | 150 |
| 12 | 2 | 6.98 | 6.51 | 5 | 750 | 1 | 7 | 150 |
| 13 | 2 | 1.00 | 0.93 | 5 | 750 | 3 | 7 | 150 |
| 14 | 5 | 4.98 | 4.65 | 5 | 950 | 8 | 10 | 150 |
| 15 | — | — | — | — | — | — | — | — |

TABLE 2

| Experimental Example | Covering portion | Molar fraction R Proportion D = 0.05 | Molar fraction R Proportion D = 0.3 | Ratio F | Increase/decrease | Cycle retention rate (%) | Heat generation starting temperature (° C.) | Elution amount (normalization) |
|---|---|---|---|---|---|---|---|---|
| 1 | Presence | 0.080 | 0.055 | 0.70 | Decrease | 93.4 | 183 | 100 |
| 2 | Presence | 0.081 | 0.065 | 0.80 | Decrease | 94.0 | 180 | 95 |
| 3 | Presence | 0.086 | 0.080 | 0.93 | Decrease | 94.3 | 179 | 90 |
| 4 | Presence | 0.031 | 0.030 | 0.97 | Decrease | 95.1 | 184 | 101 |
| 5 | Presence | 0.130 | 0.096 | 0.74 | Decrease | 93.4 | 181 | 98 |
| 6 | Presence | 0.032 | 0.030 | 0.94 | Decrease | 93.5 | 177 | 80 |
| 7 | Presence | 0.130 | 0.128 | 0.98 | Decrease | 92.1 | 185 | 104 |
| 8 | Presence | 0.130 | 0.065 | 0.50 | Decrease | 93.2 | 172 | 155 |
| 9 | Presence | 0.070 | 0.082 | 1.17 | Increase | 94.2 | 170 | 140 |
| 10 | Presence | 0.025 | 0.019 | 0.76 | Decrease | 89.1 | 181 | 91 |
| 11 | Presence | 0.020 | 0.019 | 0.95 | Decrease | 89.2 | 183 | 88 |
| 12 | Presence | 0.021 | 0.022 | 1.05 | Increase | 88.4 | 185 | 87 |
| 13 | Presence | 0.140 | 0.096 | 0.69 | Decrease | 95.2 | 168 | 140 |
| 14 | Presence | 0.030 | 0.020 | 0.67 | Decrease | 90.1 | 186 | 81 |
| 15 | Absence | 0.080 | 0.074 | 0.93 | Decrease | 94.3 | 178 | 187 |

Experimental Example 15

For comparison, a positive electrode active material (center portion) was obtained through the same procedure as in Experimental Examples 1 to 14, except that no covering portion was formed. The molar fraction R and the ratio F for the positive electrode active material are as shown in Table 2.

Experimental Examples 1 to 15

Figure 13:
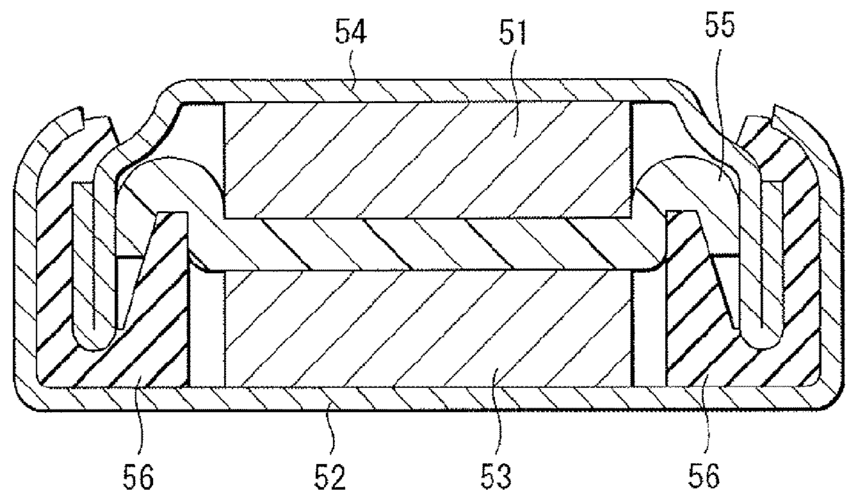
FIG. 13 is a cross-sectional view illustrating a configuration of a test-use secondary battery (coin type) according to the embodiment of the present technology.

Coin type lithium ion secondary batteries illustrated in FIG. 13 were fabricated as test-use secondary batteries by the following procedure.

In each of the secondary batteries, a test electrode 51 housed in an outer package cup 54 and a counter electrode 53 housed in an outer package can 52 are stacked with a separator 55 interposed therebetween, and the outer package can 52 and the outer package cup 54 are swaged with a gasket 56. The separator 55 is impregnated with an electrolytic solution.

In the case of fabricating the test electrode 51, first, 98 parts by mass of the foregoing positive electrode active material, 1.2 parts by mass of a positive electrode binder (polyvinylidene fluoride), and 0.8 part by mass of a positive electrode conductive agent (ketjen black) were mixed to obtain a positive electrode mixture. Subsequently, the positive electrode mixture was dispersed in an organic solvent (N-methyl-2-pyrrolidone) to obtain a paste-like positive electrode mixture slurry. Subsequently, both surfaces of a positive electrode current collector (an aluminum foil having a thickness of 15 μm) were coated with the positive electrode mixture slurry with use of a coating apparatus, and thereafter, the positive electrode mixture slurry was dried with hot air to form a positive electrode active material layer. Finally, the positive electrode active material layer was compression-molded using a hydraulic press machine.

In the case of fabricating the counter electrode 53, first, 95 parts by mass of a negative electrode active material (graphite) and 5 parts by mass of a negative electrode binder (polyvinylidene fluoride) were mixed to obtain a negative electrode mixture. Subsequently, the negative electrode mixture was dispersed in an organic solvent (N-methyl-2-pyrrolidone) to obtain paste-like negative electrode mixture slurry. Subsequently, both surfaces of a negative electrode current collector (a copper foil having a thickness of 12 μm) were coated with the negative electrode mixture slurry with use of a coating apparatus, and thereafter, the negative electrode mixture slurry was dried with hot air to form a negative electrode active material layer. Finally, the negative electrode active material layer was compression-molded using a hydraulic press machine.

In the case of preparing an electrolytic solution, an electrolyte salt (lithium hexafluorophosphate) was dissolved in a solvent (ethylene carbonate and propylene carbonate). In this case, the composition of the solvent was ethylene carbonate:propylene carbonate=1:1 in volume ratio, and the content of the electrolyte salt in the solvent was 1 mol/cm$^3$ (=1 mol/l).

In the case of assembling a secondary battery, first, the test electrode 51 was stamped into a pellet shape (diameter=15 mm), and thereafter, the test electrode 51 was housed in the outer package cup 54. Subsequently, the counter electrode 53 was stamped into a pellet shape (diameter=16 mm), and thereafter, the counter electrode 53 was housed in the outer package can 52. Subsequently, the test electrode 51 housed in the outer package cup 54 and the counter electrode 53 housed in the outer package can 52 were stacked with the separator 55 (a porous polyolefin film) impregnated with the electrolytic solution interposed therebetween. Finally, the outer package can 52 and the outer package cup 54 were swaged with the gasket 56. Thus, a coin type secondary battery was completed.

When cycle characteristics, safety characteristics, and storage characteristics were examined as battery characteristics of the secondary battery, the results shown in Table 2 were obtained.

Upon examining the cycle characteristics, first, one cycle of charging and discharging was performed on the secondary battery in an ambient temperature environment (23° C.) so as to stabilize a battery state of the secondary battery. Subsequently, one cycle of charging and discharging was performed again on the secondary battery in the same environment to measure a discharging capacity at the second cycle. Subsequently, the secondary battery was repeatedly charged and discharged until the total number of cycles reached 50 cycles in the same environment to measure a discharging capacity at the 50th cycle. Finally, a cycle retention rate (%)=(discharging capacity at the 50th cycle/discharging capacity at the second cycle)×100 was calculated.

The charge and discharge conditions in the first cycle and the second cycle are as follows. At the time of charging, the secondary battery was charged at a current of 0.5 mA until the voltage reached 4.35 V, and thereafter, the secondary battery was further charged at a voltage of 4.35 V until the total charging time reached 10 hours. At the time of discharging, the secondary battery was discharged at a current of 2.5 mA until the voltage reached 3.0 V.

The charge and discharge conditions in the third and subsequent cycles are as follows. At the time of charging, the secondary battery was charged at a current of 2.5 mA until the voltage reached 4.35 V, and thereafter, the secondary battery was further charged at a voltage of 4.35 V until the total charging time reached 2 hours. At the time of discharging, the secondary battery was discharged at a current of 2.5 mA until the voltage reached 3.0 V.

Upon examining the safety characteristics, the foregoing secondary battery in a stabilized state was used, and after one cycle of charging and discharging was performed on the secondary battery in an ambient temperature environment (23° C.), the secondary battery was charged again in the same environment.

At the time of charging, the secondary battery was charged at a current of 0.5 mA until the voltage reached 4.35 V, and thereafter, the secondary battery was further charged at a voltage of 4.35 V until the total charging time reached 10 hours. At the time of discharging, the secondary battery was discharged at a current of 2.5 mA until the voltage reached 3.0 V.

Subsequently, the test electrode 51 was taken out by disassembling the secondary battery in the charged state. Subsequently, the test electrode 51 was immersed in an organic solvent (dimethyl carbonate) (dipping time=10 minutes), and then the counter electrode 53 was dried (drying temperature=60° C., drying time=8 hours) in a vacuum environment. Subsequently, the positive electrode mixture was extracted from the test electrode 53, and then sealed in an SUS can together with a newly prepared electrolytic solution. The composition of the electrolytic solution is the same as the composition of the electrolytic solution used for fabricating the secondary battery. Finally, by measuring a differential scanning calorie using a differential scanning calorimeter (EXSTAR 6000 manufactured by Seiko Instruments Inc.), a heat generation starting temperature (° C.) of a first heat generation peak that is an index for evaluating the safety characteristics (thermal stability) was specified.

Upon examining the storage characteristics, first, a secondary battery for storage test was fabricated by the same procedure as in Experimental Examples 1 to 15 except that two separators 55 were stacked. Subsequently, one cycle of charging and discharging was performed on the secondary battery for storage test in an ambient temperature environment (23° C.), and then the secondary battery for storage test was charged again in the same environment. The charge and discharge conditions were the same as those in the case where the safety characteristics were examined. Subsequently, the secondary battery for storage test in the charged state was stored (storage time=168 hours) in a high-temperature environment (60° C.).

Subsequently, by disassembling the stored secondary battery, the counter electrode 53 and the separator 44 were taken out, and then the counter electrode 53 and the separator 55 were charged into 15 $cm^3$ (=15 ml) of 1 mol/$dm^3$ (=1 mol/l) hydrochloric acid to obtain a hydrochloric acid solution. Subsequently, the hydrochloric acid solution was boiled (boiling time=15 minutes), and then filtered. Subsequently, the concentration of cobalt contained in the filtered hydrochloric acid solution was measured using an ICP emission spectrophotometer (SPS 3100 sequential ICP emission spectrophotometer manufactured by Hitachi High-Tech Science Corporation).

Finally, based on the following formula (5), the elution amount of cobalt at the time of storing the secondary battery for storage test was calculated. The elution amount shown in Table 2 is a value obtained by normalizing the elution amount in Experimental Example 1 as 100.

Elution amount=concentration of cobalt/weight of positive electrode active material contained in test electrode 51 (5)

As is clear from Table 2, the cycle retention rate, the heat generation starting temperature, and the elution amount each greatly varied depending on the constitution of the positive electrode active material.

Specifically, in the case where the covering portion was not provided on the surface of the center portion (Experimental Example 15), although relatively good results were obtained with respect to the cycle retention rate and the heat generation starting temperature, the elution amount remarkably increased.

On the other hand, in the case where the covering portion is provided on the surface of the center portion (Experimental Examples 1 to 14), when the molar fraction R with the proportion D satisfying D=0.05 satisfies $0.03<R<0.13$, the molar fraction R with the proportion D satisfying D=0.3 satisfies $0.01<R<0.13$, and the ratio F satisfies $0.7 \leq F \leq 1$ (Experimental Examples 1 to 7), a good cycle retention rate is obtained while suppressing the elution amount, and the heat generation starting temperature increases, as compared with the case where these three conditions are not satisfied (Experimental Examples 8 to 14).

From these facts, the positive electrode of the present technology satisfies the above three conditions simultaneously with respect to the distribution (molar fraction R and ratio F) of the main constituent elements (cobalt, element M, nickel, and manganese) of the positive electrode active material. In this case, the covering state of the center portion covered with the main constituent elements (nickel and manganese) in the covering portion is optimized, and the function of stabilizing the crystal structure of the positive electrode active material due to the main constituent element (element M) in the center portion is effectively exerted. Consequently, as shown in Tables 1 and 2, the cycle characteristics, the safety characteristics, and the storage characteristics were all improved. Thus, excellent battery characteristics were obtained in the secondary battery.

The present technology is described thus far with reference to embodiments and examples thereof; however, the present technology is not limited to the examples described in the embodiments and examples above, but various modifications may be made.

For example, for describing the configuration of the secondary battery of the present technology, the description is given with reference to examples where a battery structure is of the cylindrical type, the laminated film type, and the coin type, and the battery element has the spirally wound structure. However, the secondary battery of the present technology is applicable to a battery having other battery structure such as a square-type or a button-type battery, or a battery in which the battery device has other structure such as a stacked structure.

Further, for example, the secondary battery-use positive electrode active material and the secondary battery-use positive electrode of the present technology may be applied not only to a secondary battery, but also to other electrochemical devices. Examples of the other electrochemical devices may include a capacitor.

The effects described in the present specification are illustrative and non-limiting, and the technology may have effects other than those described in the present specification.

The present technology is described below in further detail according to an embodiment.

(1)

A secondary battery including a positive electrode containing a positive electrode active material, a negative electrode, and an electrolytic solution, in which the positive electrode active material includes a center portion that contains a lithium composite oxide containing cobalt (Co) and an element M as constituent elements and is represented by formula (1) below, and a covering portion that is provided on at least a portion of a surface of the center portion and contains lithium (Li), nickel (Ni) and manganese (Mn) as constituent elements, each of the cobalt, the element M, the nickel, and the manganese is distributed such that a concentration of each of the cobalt, the element M, the nickel, and the manganese has a gradient in a direction from a surface toward a center of the positive electrode active material, a depth from the surface of the positive electrode active material is defined by a proportion D (%) represented by formula (2) below, an amount of the element M existing in the positive electrode active material is defined by a molar fraction R represented by formula (3) below, the molar fraction R satisfies $0.03<R<0.13$ at a position within the covering portion where the proportion D satisfies D=0.05, the molar fraction R satisfies $0.01<R<0.13$ at a position within the center portion where the proportion D satisfies D=0.3, and a ratio F of the molar fraction R (D=0.3) to the molar fraction R (D=0.05) satisfies $0.7 \leq F \leq 1$.

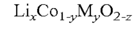

$$Li_xCo_{1-y}M_yO_{2-z} \quad (1)$$

where M is at least one element of magnesium (Mg), aluminum (Al), boron (B), titanium (Ti), vanadium (V), chromium (Cr), iron (Fe), copper (Cu), zinc (Zn), molybdenum (Mo), tin (Sn), tungsten (W), zirconium (Zr), yttrium (Y), niobium (Nb), calcium (Ca), strontium (Sr), bismuth (Bi), sodium (Na), potassium (K), silicon (Si) and phosphorus (P), and x, y and z satisfy $0 \leq x \leq 1$, $0<y<0.5$ and $-0.1 \leq z \leq 0.2$ $$D\ (\%)=[(\text{mass of cobalt}+\text{mass of element M}+\text{mass of nickel}+\text{mass of manganese})/\text{mass of positive electrode active material}]\times 100 \quad (2)$$

$$R=\text{amount of element M}/(\text{amount of cobalt}+\text{amount of element M}+\text{amount of nickel}+\text{amount of manganese}) \quad (3)$$

(2)

The secondary battery according to (1), in which the element M is magnesium.

(3)

The secondary battery according to one of (1) and (2), in which the lithium composite oxide has a layered rock-salt type crystal structure.

(4)

The secondary battery according to any one of (1) to (3), which is a lithium ion secondary battery.

(5)

A secondary battery-use positive electrode including a positive electrode active material, in which the positive electrode active material includes a center portion that contains a lithium composite oxide containing cobalt and an element M as constituent elements and is represented by formula (1) below, and a covering portion that is provided on at least a portion of a surface of the center portion and contains lithium, nickel, and manganese as constituent elements, each of the cobalt, the element M, the nickel, and the manganese is distributed such that a concentration of each of the cobalt, the element M, the nickel, and the manganese has a gradient in a direction from a surface toward a center of the positive electrode active material, a depth from the surface of the positive electrode active material is defined by a proportion D (%) represented by formula (2) below, an amount of the element M existing in the positive electrode active material is defined by a molar fraction R represented by formula (3) below, the molar fraction R satisfies $0.03<R<0.13$ at a position within the covering portion where the proportion D satisfies $D=0.05$, the molar fraction R satisfies $0.01<R<0.13$ at a position within the center portion where the proportion D satisfies $D=0.3$, and a ratio F of the molar fraction R ($D=0.3$) to the molar fraction R ($D=0.05$) satisfies $0.7 \leq F \leq 1$.

$$Li_xCo_{1-y}M_yO_{2-z} \quad (1)$$

M is at least one element of magnesium, aluminum, boron, titanium, vanadium, chromium, iron, copper, zinc, molybdenum, tin, tungsten, zirconium, yttrium, niobium, calcium, strontium, bismuth, sodium, potassium, silicon, and phosphorus. x, y and z satisfy $0 \leq x \leq 1$, $0<y<0.5$ and $-0.1 \leq z \leq 0.2$ $$D\ (\%)=[(\text{mass of cobalt}+\text{mass of element M}+\text{mass of nickel}+\text{mass of manganese})/\text{mass of positive electrode active material}]\times 100 \quad (2)$$

$$R=\text{amount of element M}/(\text{amount of cobalt}+\text{amount of element M}+\text{amount of nickel}+\text{amount of manganese}) \quad (3)$$

(6)

A secondary battery-use positive electrode active material including a center portion that contains a lithium composite oxide containing cobalt and an element M as constituent elements and is represented by formula (1) below, and a covering portion that is provided on at least a portion of a surface of the center portion and contains lithium, nickel, and manganese as constituent elements, in which each of the cobalt, the element M, the nickel, and the manganese is distributed such that a concentration of each of the cobalt, the element M, the nickel, and the manganese has a gradient in a direction from a surface of the covering portion toward a center of the center portion, a depth from a surface of the covering portion is defined by a proportion D (%) represented by formula (2) below, an amount of the element M existing in each of the center portion and the covering portion is defined by a molar fraction R represented by formula (3) below, the molar fraction R satisfies $0.03<R<0.13$ at a position within the covering portion where the proportion D satisfies $D=0.05$, the molar fraction R satisfies $0.01<R<0.13$ at a position within the center portion where the proportion D satisfies $D=0.3$, and a ratio F of the molar fraction R ($D=0.3$) to the molar fraction R ($D=0.05$) satisfies $0.7 \leq F \leq 1$.

$$Li_xCo_{1-y}M_yO_{2-z} \quad (1)$$

M is at least one element of magnesium, aluminum, boron, titanium, vanadium, chromium, iron, copper, zinc, molybdenum, tin, tungsten, zirconium, yttrium, niobium, calcium, strontium, bismuth, sodium, potassium, silicon, and phosphorus. x, y and z satisfy $0 \leq x \leq 1$, $0<y<0.5$ and $-0.1 \leq z \leq 0.2$ $$D\ (\%)=[(\text{mass of cobalt}+\text{mass of element M}+\text{mass of nickel}+\text{mass of manganese})/\text{mass of center portion}+\text{mass of covering portion}]\times 100 \quad (2)$$

$$R=\text{amount of element M}/(\text{amount of cobalt}+\text{amount of element M}+\text{amount of nickel}+\text{amount of manganese}) \quad (3)$$

(7)

A battery pack including the secondary battery according to any one of (1) to (4), a controller that controls an operation of the secondary battery, and a switch section that switches the operation of the secondary battery according to an instruction of the controller.

(8)

An electric vehicle including the secondary battery according to any one of (1) to (4), a convertor that converts electric power supplied from the secondary battery into drive power, a drive section that operates according to the drive power, and a controller that controls an operation of the secondary battery.

(9)

An electric power storage system including the secondary battery according to any one of (1) to (4), at least one electrical appliance that is supplied with electric power from the secondary battery, and a controller that controls electric power supply from the secondary battery to the electrical appliance.

(10)

An electric power tool including the secondary battery according to any one of (1) to (4) and a movable section that is supplied with electric power from the secondary battery.

(11)

An electronic apparatus including the secondary battery according to any one of (1) to (4) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising a positive electrode including a positive electrode active material, a negative electrode, and an electrolytic solution, wherein the positive electrode active material includes a center portion and a covering portion, the center portion includes a lithium composite oxide including cobalt (Co) and an element M as constituent elements and is represented by formula (1) below, and the covering portion is provided on at least a portion of a surface of the center portion and includes lithium (Li), nickel (Ni) and manganese (Mn) as constituent elements, a concentration of each of the cobalt, the element M, the nickel, and the manganese has a gradient in a direction from a surface toward a center of the positive electrode active material, a depth from the surface of the positive electrode active material is defined by a proportion D (%) represented by formula (2) below, an amount of the element M existing in the positive electrode active material is defined by a molar fraction R represented by formula (3) below, a first molar fraction satisfies $0.03<R<0.13$ at a first position within the covering portion where the proportion D satisfies D=0.05, a second molar fraction satisfies $0.01<R<0.13$ at a second position within the center portion where the proportion D satisfies D=0.3, and a ratio F of the second molar fraction to the first molar fraction satisfies $0.7\leq F\leq 1$, wherein formula (1) is provided as $Li_xCo_{1-y}M_yO_{2-z}$ . . . (1), wherein M includes one or more elements of magnesium (Mg), aluminum (Al), boron (B), titanium (Ti), vanadium (V), chromium (Cr), iron (Fe), copper (Cu), zinc (Zn), molybdenum (Mo), tin (Sn), tungsten (W), zirconium (Zr), yttrium (Y), niobium (Nb), calcium (Ca), strontium (Sr), bismuth (Bi), sodium (Na), potassium (K), silicon (Si) and phosphorus (P), and x, y and z satisfy $0\leq x\leq 1$, $0<y<0.5$ and $-0.1\leq z\leq 0.2$;

wherein formula (2) is provided as D (%)=[(mass of cobalt+mass of element M+mass of nickel+mass of manganese)/mass of positive electrode active material]×100% . . . (2); and wherein formula (3) is provided as R=amount of element M/(amount of cobalt+amount of element M+amount of nickel+amount of manganese) . . . (3).

2. The secondary battery according to claim 1, wherein the element M is magnesium.

3. The secondary battery according to claim 1, wherein the lithium composite oxide has a layered rock-salt type crystal structure.

4. The secondary battery according to claim 1, wherein the secondary battery includes a lithium ion secondary battery.

5. The secondary battery according to claim 1, wherein the concentration of each of the cobalt, the element M, the nickel, and the manganese has the gradient increasing from the surface toward the center of the positive electrode active material.

6. The secondary battery according to claim 1, wherein the concentration of each of the cobalt, the element M, the nickel, and the manganese has the gradient decreasing from the surface toward the center of the positive electrode active material.

7. A positive electrode of a secondary battery comprising a positive electrode active material, wherein the positive electrode active material includes a center portion and a covering portion, the center portion includes a lithium composite oxide including cobalt and an element M as constituent elements and is represented by formula (1) below, and the covering portion is provided on at least a portion of a surface of the center portion and includes lithium, nickel, and manganese as constituent elements, a concentration of each of the cobalt, the element M, the nickel, and the manganese has a gradient in a direction from a surface toward a center of the positive electrode active material, a depth from the surface of the positive electrode active material is defined by a proportion D represented by formula (2) below, an amount of the element M existing in the positive electrode active material is defined by a molar fraction R represented by formula (3) below, a first molar fraction satisfies $0.03<R<0.13$ at a first position within the covering portion where the proportion D satisfies D=0.05, a second molar fraction satisfies $0.01<R<0.13$ at a second position within the center portion where the proportion D satisfies D=0.3, and a ratio F of the second molar fraction to the first molar fraction satisfies $0.7\leq F\leq 1$, wherein formula (1) is provided as $Li_xCo_{1-y}M_yO_{2-z}$ . . . (1), wherein M includes one or more elements of magnesium, aluminum, boron, titanium, vanadium, chromium, iron, copper, zinc, molybdenum, tin, tungsten, zirconium, yttrium, niobium, calcium, strontium, bismuth, sodium, potassium, silicon, and phosphorus, x, y and z satisfy $0\leq x\leq 1$, $0<y<0.5$ and $-0.1\leq z\leq 0.2$;

wherein formula (2) is provided as D (%)=[(mass of cobalt+mass of element M+mass of nickel+mass of manganese)/mass of positive electrode active material]×100% . . . (2); and wherein formula (3) is provided as R=amount of element M/(amount of cobalt+amount of element M+amount of nickel+amount of manganese) . . . (3).

8. A positive electrode active material of a secondary battery comprising:

a center portion, and a covering portion, wherein the center portion includes a lithium composite oxide containing cobalt and an element M as constituent elements and is represented by formula (1) below, and the covering portion is provided on at least a portion of a surface of the center portion and includes lithium, nickel, and manganese as constituent elements, wherein a concentration of each of the cobalt, the element M, the nickel, and the manganese has a gradient in a direction from a surface of the covering portion toward a center of the center portion, wherein a depth from a surface of the covering portion is defined by a proportion D (%) represented by formula (2) below, an amount of the element M existing in each of the center portion and the covering portion is defined by a molar fraction R represented by formula (3) below, wherein a first molar fraction satisfies $0.03<R<0.13$ at a first position within the covering portion where the proportion D satisfies D=0.05, wherein a second molar fraction satisfies $0.01<R<0.13$ at a second position within the center portion where the proportion D satisfies D=0.3, wherein a ratio F of the second molar fraction to the first molar fraction satisfies $0.7\leq F\leq 1$, wherein formula (1) is provided as $Li_xCo_{1-y}M_yO_{2-z}$ . . . (1), wherein M includes one or more elements of magnesium, aluminum, boron, titanium, vanadium, chromium, iron, copper, zinc, molybdenum, tin, tungsten, zirconium, yttrium, niobium, calcium, strontium, bismuth, sodium, potassium, silicon, and phosphorus, x, y and z satisfy $0\leq x\leq 1$, $0<y<0.5$ and $-0.1\leq z\leq 0.2$;

wherein formula (2) is provided as D (%)=[(mass of cobalt+mass of element M+mass of nickel+mass of manganese)/mass of center portion+mass of covering portion]×100% . . . (2);

wherein formula (3) is provided as R=amount of element M/(amount of cobalt+amount of element M+amount of nickel+amount of manganese) . . . (3).

9. A battery pack comprising:

the secondary battery according to claim 1, a controller configured to control an operation of the secondary battery, and a switch configured to switch the operation of the secondary battery according to an instruction of the controller.

10. An electric vehicle comprising:

the secondary battery according to claim 1, a convertor configured to convert electric power supplied from the secondary battery into drive power, a drive section configured to operate according to the drive power, and a controller configured to control an operation of the secondary battery.

11. An electric power storage system comprising:

the secondary battery according to claim 1, at least one electrical appliance configured to be supplied with electric power from the secondary battery, and a controller configured to control electric power supply from the secondary battery to the electrical appliance.

12. An electric power tool comprising:

the secondary battery according to claim 1, and a movable section configured to be supplied with electric power from the secondary battery.

13. An electronic apparatus comprising:

the secondary battery according to claim 1 as an electric power supply source.

* * * * *